(12) United States Patent
Burrington et al.

(10) Patent No.: US 10,774,283 B2
(45) Date of Patent: Sep. 15, 2020

(54) ALIPHATIC TETRAHEDRAL BORATE COMPOUNDS FOR FULLY FORMULATED LUBRICATING COMPOSITIONS

(71) Applicant: The Lubrizol Corporation, Wickliffe, OH (US)

(72) Inventors: James D. Burrington, Gates Mills, OH (US); Ewan E. Delbridge, Concord Township, OH (US); Binbin Guo, Sagamore Hills, OH (US); Jason J. Hanthorn, Eastlake, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 57 days.

(21) Appl. No.: 16/318,474

(22) PCT Filed: Jul. 21, 2017

(86) PCT No.: PCT/US2017/043205
§ 371 (c)(1),
(2) Date: Jan. 17, 2019

(87) PCT Pub. No.: WO2018/017913
PCT Pub. Date: Jan. 25, 2018

(65) Prior Publication Data
US 2019/0292483 A1 Sep. 26, 2019

Related U.S. Application Data

(60) Provisional application No. 62/365,416, filed on Jul. 22, 2016.

(51) Int. Cl.
*C10M 139/00* (2006.01)
*C07F 5/04* (2006.01)
(Continued)

(52) U.S. Cl.
CPC ........... *C10M 139/00* (2013.01); *C07F 5/022* (2013.01); *C10M 101/00* (2013.01); *C10M 129/10* (2013.01); *C10M 135/10* (2013.01); *C10M 135/34* (2013.01); *C10M 137/10* (2013.01); *C10M 141/12* (2013.01); *C10M 149/10* (2013.01); *C10M 161/00* (2013.01); *C10M 169/044* (2013.01); *C10M 2203/003* (2013.01); *C10M 2203/1006* (2013.01); *C10M 2203/1025* (2013.01); *C10M 2205/028* (2013.01); *C10M 2205/0285* (2013.01); *C10M 2205/04* (2013.01); *C10M 2207/028* (2013.01); *C10M 2207/04* (2013.01); *C10M 2207/126* (2013.01); *C10M 2207/127* (2013.01); *C10M 2207/262* (2013.01); *C10M 2209/084* (2013.01); *C10M 2209/104* (2013.01); *C10M 2209/105* (2013.01); *C10M 2215/04* (2013.01); *C10M 2215/223* (2013.01); *C10M 2215/224* (2013.01); *C10M 2215/28* (2013.01); *C10M 2217/028* (2013.01); *C10M 2217/044* (2013.01); *C10M 2219/04* (2013.01); *C10M 2219/044* (2013.01); *C10M 2219/046* (2013.01); *C10M 2219/102* (2013.01); *C10M 2219/104* (2013.01); *C10M 2223/04* (2013.01); *C10M 2223/045* (2013.01); *C10M 2227/061* (2013.01); *C10M 2227/062* (2013.01); *C10M 2229/025* (2013.01); *C10M 2229/051* (2013.01); *C10N 2010/02* (2013.01); *C10N 2010/04* (2013.01); *C10N 2010/08* (2013.01); *C10N 2010/12* (2013.01); *C10N 2020/04* (2013.01); *C10N 2030/04* (2013.01); *C10N 2030/06* (2013.01); *C10N 2030/10* (2013.01); *C10N 2030/12* (2013.01); *C10N 2030/18* (2013.01);
(Continued)

(58) Field of Classification Search
CPC ................................ C10M 139/00; C07F 5/04
See application file for complete search history.

(56) References Cited

U.S. PATENT DOCUMENTS

| 2,902,450 A | 9/1959 | Lowe |
| 4,237,022 A | 12/1980 | Barrer |

(Continued)

FOREIGN PATENT DOCUMENTS

| EP | 0693704 A1 | 1/1996 |
| WO | 2011/056168 A1 | 5/2011 |

OTHER PUBLICATIONS

Cinzia Chiappe et al., "Novel (Glycerol)Borate-Based Ionic Liquids: An Experimental and Theoretical Study", The Journal of Physical Chemistry B, vol. 114, No. 15, Apr. 22, 2010, pp. 5082-5088.

*Primary Examiner* — Ellen M McAvoy
(74) *Attorney, Agent, or Firm* — Michael Miller; Deron Cook; Teresan Gilbert

(57) ABSTRACT

A fully-formulating lubricating composition comprising an oil of lubricating viscosity; an ionic tetrahedral borate compound including a tetrahedral borate anion having a boron atom with two bidentate di-oxo ligands both being a linear C18-tartrimide; a first dispersant comprising a conventional ammonium substituted polyisobutenyl succinimide compound having a polyisobutenyl number average molecular weight of 750 to 2,500; a second dispersant comprising an ammonium substituted polyisobutenyl succinimde compound having an N:CO ratio of 1.8 and a polyisobutylenyl number average molecular weight of 750 to 2,500, wherein one or more of the first dispersant and the second dispersant are in cationic form. The fully formulated lubricating composition including one or more performance additives.

41 Claims, No Drawings

(51) Int. Cl.
*C07F 5/02* (2006.01)
*C10M 101/00* (2006.01)
*C10M 129/10* (2006.01)
*C10M 135/10* (2006.01)
*C10M 135/34* (2006.01)
*C10M 137/10* (2006.01)
*C10M 141/12* (2006.01)
*C10M 149/10* (2006.01)
*C10M 161/00* (2006.01)
*C10M 169/04* (2006.01)
*C10N 10/02* (2006.01)
*C10N 10/04* (2006.01)
*C10N 10/08* (2006.01)
*C10N 10/12* (2006.01)
*C10N 20/04* (2006.01)
*C10N 30/04* (2006.01)
*C10N 30/06* (2006.01)
*C10N 30/10* (2006.01)
*C10N 30/12* (2006.01)
*C10N 30/18* (2006.01)
*C10N 30/00* (2006.01)
*C10N 40/04* (2006.01)
*C10N 40/08* (2006.01)
*C10N 40/25* (2006.01)
*C10N 40/26* (2006.01)
*C10N 60/14* (2006.01)

(52) U.S. Cl.
CPC ...... *C10N 2030/36* (2020.05); *C10N 2030/52* (2020.05); *C10N 2030/70* (2020.05); *C10N 2040/04* (2013.01); *C10N 2040/042* (2020.05); *C10N 2040/044* (2020.05); *C10N 2040/08* (2013.01); *C10N 2040/25* (2013.01); *C10N 2040/251* (2020.05); *C10N 2040/252* (2020.05); *C10N 2040/253* (2020.05); *C10N 2040/255* (2020.05); *C10N 2040/26* (2013.01); *C10N 2060/14* (2013.01)

(56) References Cited

U.S. PATENT DOCUMENTS

| | | |
|---|---|---|
| 4,455,243 A | 6/1984 | Liston |
| 2014/0011720 A1 | 1/2014 | Antzutkin et al. |
| 2018/0030369 A1* | 2/2018 | Burrington .......... C10M 149/10 |
| 2018/0066204 A1* | 3/2018 | Sampler ............... C10M 139/00 |
| 2019/0024010 A1* | 1/2019 | Blumenfeld ....... C10M 101/025 |
| 2019/0024014 A1* | 1/2019 | Blumenfeld ......... C10M 159/18 |
| 2019/0024015 A1* | 1/2019 | Blumenfeld ......... C10M 143/14 |
| 2019/0264123 A1* | 8/2019 | Burrington .......... C10M 137/10 |

* cited by examiner

ALIPHATIC TETRAHEDRAL BORATE COMPOUNDS FOR FULLY FORMULATED LUBRICATING COMPOSITIONS

CROSS REFERENCE TO RELATED APPLICATION

This application claims priority from PCT Application Serial No. PCT/US2017/043205 filed on Jul. 21, 2017, which claims the benefit of U.S. Provisional Application No. 62/365,416 filed on Jul. 22, 2016, both of which are incorporated in their entirety by reference herein.

BACKGROUND

The exemplary embodiments of the present invention relate to lubricant additives and in particular to ionic borate compounds useful in lubricating compositions, and particularly, useful as friction modifiers having improved solubility and friction performance in the lubricant.

Conventional friction modifiers may often only be used in limited ways due to solubility and/or compatibility issues with the functional fluids in which they are used. Friction modifiers, when used at levels above their solubility and/or compatibility limits, may fall out of the functional fluid composition over time and/or cause the composition to appear hazy or cloudy.

In the field, functional fluid compositions that drop out one or more components over time may not perform properly unless they are well-mixed before use, or they may be removed by filters associated with the equipment in which the functional fluid is used. The haziness and/or cloudiness of a functional fluid, which may be measured as the fluid's turbidity, is often seen as a sign the composition is not stable, or may be in an early stage of separation and/or component drop out. Such conditions are not desired in functional fluid compositions, for both performance and aesthetic related reasons. This reality has created constraints on the use of various friction modifiers and limited effective maximum treat rates.

Without these solubility and/or compatibility limitations on the use of these friction modifiers, greater performance and equipment protection might be achievable, including for example extended life of a lubricant or a lubricated piece of equipment such as engines, automatic transmissions, gear assemblies and the like. Improved fuel economy and viscosity stability might be achievable as well. Greater performance may even be achievable with lesser amounts of friction modifying compounds, as it may be possible to select more effective, but traditionally less compatible or soluble compounds when delivered in a conventional manner.

There is a need for functional fluid compositions that contain higher amounts of friction modifiers while still remaining stable and/or clear. There is particularly a need for functional fluid compositions, such as engine oil compositions, that contain friction modifiers at levels that would otherwise cause the composition to be unstable and/or hazy, as described above. The compositions and methods of the present invention overcome these constraints and thus allow the use of friction modifiers at levels not otherwise easily achievable while still maintaining the stability and/or clarity of the functional fluid composition.

The exemplary ionic tetrahedral borate compounds provide lubricating compositions with good friction properties while enhancing the solubility of the friction modifier, thereby facilitating higher potential treat rates. Additionally, the borate compounds of the present invention may include detergent, anti-oxidant and/or dispersant properties, which may be contributed by one or more counterions in the borate compound.

BRIEF DESCRIPTION

In accordance with one aspect of the exemplary embodiment, a fully formulated lubricating composition includes an oil of lubricating viscosity, an ionic tetrahedral borate compound including a tetrahedral borate anion having a boron atom with two bidentate di-oxo ligands both being a linear $C_{18}$-tartrimide, a first dispersant comprising a conventional ammonium substituted polyisobutenyl succinimide compound having a polyisobutenyl number average molecular weight of 750 to 2,500, and a second dispersant comprising an ammonium substituted polyisobutenyl succinimde compound having an N:CO ratio of 1.8 and a polyisobutylenyl number average molecular weight of 750 to 2,500, wherein one or more of the first dispersant and the second dispersant are in cationic form. The fully formulated lubricating composition further includes a performance additive selected from one or more of a detergent, an antioxidant, a dispersant, an anti-wear agent, a viscosity modifier, an extreme pressure agent, a foam inhibitor, a corrosion inhibitor, a pour point depressant, a friction modifier, a demulsifier, and a seal swell agent.

In another embodiment, a fully formulated lubricating composition includes an oil of lubricating viscosity; an ionic tetrahedral borate compound including a tetrahedral borate anion having a boron atom with two bidentate di-oxo ligands both being a linear $C_{18}$-tartrimide, a first dispersant comprising a conventional ammonium substituted polyisobutenyl succinimide compound having a polyisobutenyl number average molecular weight of 750 to 2,500, and a second dispersant comprising an ammonium substituted polyisobutenyl succinimde compound having an N:CO ratio of 1.8 and a polyisobutylenyl number average molecular weight of 750 to 2,500, wherein one or more of the first dispersant and the second dispersant are in cationic form. Such an embodiment further includes a polyisobutenylsuccinimide dispersant; an overbased metal-containing detergent selected from the group consisting of an alkaline earth metal sulfonate, a phenate and a salicylate; a zinc dialkyldithiophosphate; an ashless antioxidant; and a performance additive including one or more of a viscosity modifier, an extreme pressure agent, a foam inhibitor, a corrosion inhibitor, a pour point depressant, a friction modifier, a demulsifier, and a seal swell agent.

In accordance with another embodiment, a method of lubricating an internal combustion engine includes supplying a fully-formulated lubricating composition to a lubricating system of the engine, the fully formulated lubricating composition including an oil of lubricating viscosity, an ionic tetrahedral borate compound including a tetrahedral borate anion having a boron atom with two bidentate di-oxo ligands both being a linear $C_{18}$-tartrimide, a first dispersant comprising a conventional ammonium substituted polyisobutenyl succinimide compound having a polyisobutenyl number average molecular weight of 750 to 2,500, a second dispersant comprising an ammonium substituted polyisobutenyl succinimde compound having an N:CO ratio of 1.8 and a polyisobutylenyl number average molecular weight of 750 to 2,500, wherein one or more of the first dispersant and the second dispersant are in cationic form, and a performance additive including one or more of a detergent, an antioxidant, a dispersant, an anti-wear agent, a viscosity modifier, an extreme pressure agent, a foam inhibitor, a corrosion inhibitor, a pour point depressant, a friction modifier, a demulsifier, and a seal swell agent.

DETAILED DESCRIPTION

Aspects of the exemplary embodiment relate to a lubricating composition, a method of lubrication, and a use of the lubricating composition.

The exemplary lubricating composition includes an oil of lubricating viscosity (or "base oil"), and an ionic borate compound which can serve as a one or more of a friction modifier, dispersant, antioxidant, or detergent in the lubricating composition.

The ionic borate compound may be present in the lubricating composition at a total concentration of at least 0.01 wt. %, or at least 0.1 wt. %, or at least 0.5 wt. % or at least 0.6 wt. %, or at least 1 wt. %. The ionic borate compound may be present in the lubricating composition at a total concentration of up to 10 wt. %, or up to 8 wt. %, or up to 5 wt. %, or up to 4.5 wt. % or up to 3.5 wt. %.

A. The Ionic Borate Compound

The exemplary ionic borate compound, which may also be referred to as a tetrahedral borate compounds, includes at least one four-coordinate borate anion and a cation serving as the counter ion in the compound. The four-coordinate borate anion includes a boron atom which is directly attached to four oxygen atoms (a $BO_4^-$ unit). The borate ion may be tetrahedral. In a tetrahedral borate ion, the configuration of the $BO_4^-$ unit is tetrahedral, rather than planar. This structure can be achieved by proper selection of aliphatic di-hydroxyl compounds and forming the ionic borate compound in basic conditions.

The borate anion includes at least one bidentate di-oxo ligand derived from an aliphatic di-hydroxyl compound. In some embodiments, the borate anion includes two bidentate di-oxo ligands derived from one or more aliphatic di-hydroxyl compound. Each bidentate di-oxo ligand forms a coordinate with the boron atom through its two oxo groups (—O—) forming a ring which includes —O—B—O—.

In one embodiment, the borate anion may be free or substantially free of aromatic bidentate di-oxo ligands; that is, di-oxo ligands in which one or both oxygen atoms linked to the boron are also directly bonded to an aromatic group. This is in contrast to aliphatic bidentate di-oxo ligands of the present invention, wherein both oxygen atoms linked to the boron are bonded to non-aromatic carbon atoms, that is, carbon atoms that are not in an aromatic ring.

The ionic tetrahedral borate compound may be represented by the general structure shown in Formula I:

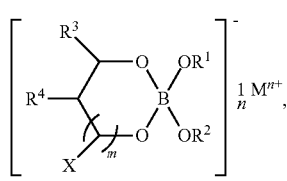

Formula I where $R^1$ and $R^2$ are independently selected from aromatic and substituted aromatic groups, aliphatic hydrocarbyl groups of 1 to 48 carbon atoms or taken together, form a substituted or unsubstituted 5- or 6-membered ring;

$R^3$ and $R^4$ are independently hydrogen (with the proviso that both $R^3$ and $R^4$ are typically not hydrogen) or aliphatic hydrocarbyl groups of 1 to 48 carbon atoms or taken together, form a substituted or unsubstituted 5- or 6-membered aliphatic ring, which may be a heterocyclic ring (that may be substituted with one or more hydrocarbyl groups of 1 to 32 carbon atoms);

m is 0 or 1;

X is selected from hydrogen, a hydrocarbyl group of 1 to 24 carbon atoms, —$OR^5$, —$NHR^5$, =O, and mixtures thereof;

$R^5$ is a hydrocarbyl group of 1 to 24 carbon atoms;

M represents the cation; and n is an integer, i.e., at least 1, and can be up to 7, or up to 4.

For convenience, the borate anion of Formula I may be represented as $[B]^-$.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. By predominantly hydrocarbon character, it is meant that at least 70% or at least 80% of the atoms in the substituent are hydrogen or carbon. In some embodiments, the hydrocarbyl group may have a limited number of non-hydrocarbon atoms, such as N, O, P or S.

Examples of hydrocarbyl groups include:

(i) hydrocarbon substituents, that is, aliphatic (e.g., alkyl or alkenyl), alicyclic (e.g., cycloalkyl, cycloalkenyl) substituents, and aromatic substituted aliphatic or alicyclic substituents, as well as cyclic substituents wherein the ring is completed through another portion of the molecule (e.g., two substituents together form a ring);

(ii) substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulfoxy);

(iii) hetero substituents, that is, substituents which, while having a predominantly hydrocarbon character, may contain other than carbon in a ring or chain otherwise composed of carbon atoms.

Representative alkyl groups include n-butyl, iso-butyl, sec-butyl, n-pentyl, amyl, neopentyl, n-hexyl, n-heptyl, secondary heptyl, n-octyl, secondary octyl, 2-ethyl hexyl, n-nonyl, secondary nonyl, undecyl, secondary undecyl, dodecyl, secondary dodecyl, tridecyl, secondary tridecyl, tetradecyl, secondary tetradecyl, hexadecyl, secondary hexadecyl, stearyl, icosyl, docosyl, tetracosyl, 2-butyloctyl, 2-butyldecyl, 2-hexyloctyl, 2-hexydecyl, 2-octyldecyl, 2-hexydodecyl, 2-octyldodecyl, 2-decyltetradecyl, 2-dodecylhexadecyl, 2-hexyldecyloctyldecyl, 2-tetradecyloctyldecy, monomethyl branched-isostearyl, and the like.

Representative aryl groups include phenyl, toluyl, xylyl, cumenyl, mesityl, benzyl, phenethyl, styryl, cinnamyl, benzahydryl, trityl, ethylphenyl, propylphenyl, butylphenyl, pentylphenyl, hexylphenyl, heptylphenyl, octylphenyl, nonylphenyl, decylphenyl, undecylphenyl, dodecylphenyl benzylphenyl, styrenated phenyl, p-cumylphenyl, α-naphthyl, β-naphthyl groups, and mixtures thereof. For purposes of this invention, compounds comprising an aromatic group attached directly to one or more of the oxygen atoms linked to the boron atom of the ionic tetrahedral borate compound are excluded.

Heteroatoms include sulfur, oxygen, nitrogen, and encompass substituents as pyridyl, furyl, thienyl and imidazolyl. In general, no more than two, and in one embodiment, no more than one, non-hydrocarbon substituent will be present for every ten carbon atoms in the hydrocarbyl group. In some embodiments, there are no non-hydrocarbon substituents in the hydrocarbyl group.

In Formula I, $R^1$ and $R^2$ may be independently selected from aliphatic hydrocarbyl groups of 1 to 48 carbon atoms. Alternatively, $R^1$ and $R^2$, in combination, may form a substituted or unsubstituted 5-membered or 6-membered ring. In the case of $R^1$ and $R^2$ forming a substituted 5-membered or 6-membered ring, the substituents may be selected from aliphatic hydrocarbyl groups, which may include one or two heteroatoms, and combinations thereof.

In some embodiments, $R^1$ and $R^2$ together form a substituted or unsubstituted 5-membered or 6-membered ring, wherein the substituted or unsubstituted 5- or 6-membered ring includes 1 or 2 heteroatoms. The substituted 5-membered or 6-membered ring formed by $R^1$ and $R^2$ may be substituted with at least one substituent selected from aliphatic hydrocarbyl groups, aliphatic hydrocarbyl groups comprising at least one heteroatom, and combinations thereof.

Example substituted and unsubstituted 5-membered and 6-membered rings which are formed by $R_1$ and $R_2$ include bidentate di-oxo ligands analogous to those which include $R^3$ and $R^4$. In this embodiment, the structure of the tetrahedral borate ion of the borate compound may be represented by the structure shown in Formula II:

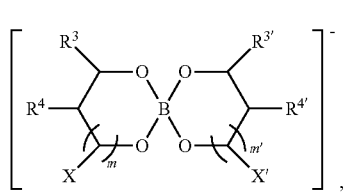

Formula II where $R^{3'}$, $R^{4'}$, may be as described for $R^3$, $R^4$; and $X'$ and $m'$ may be as described for $X$ and $m$, respectively.

In Formulas I and II, $R^3$ and $R^4$, may be independently selected from aliphatic hydrocarbyl groups of 1 to 48 carbon atoms or taken together, form a substituted or unsubstituted 5- or 6-membered aliphatic ring, which may be alicyclic or heterocyclic. In the case of $R^3$ and $R^4$ representing a substituted aliphatic ring, the ring may be alicyclic or heterocyclic and the substituents may include one or more of hydrocarbyl groups of 1 to 32 carbon atoms, hydroxide groups, alkoxy groups, and combinations thereof. Example alkoxy groups useful herein include methoxy, ethoxy and the like.

In the tetrahedral borate compound of Formula I, M represents the conjugate cation (and is also the conjugate cation for the anions in Formulas II-VII). Exemplary cations M can include metal cations, ammonium cations, phosphonium cations, ash-free organic cations (some of which may also be ammonium cations or phosphonium cations), and mixtures thereof.

Exemplary metal cations include alkali metal cations, alkaline earth metal cations, transition metal cations, and combinations thereof. Examples of metal cations include $Li^+$, $Na^+$, $K^+$, $Rb^+$, $Cs^+$, $Be^{2+}$, $Mg^{2+}$, $Ca^{2+}$, $Sr^{2+}$, $Ba^{2+}$, $Sc^{3+}$, $Sc^{2+}$, $Sc^+$, $Y^{3+}$, $Y^{2+}$, $Y^+$, $Ti^{4+}$, $Ti^{3+}$, $Ti^{2+}$, $Zr^{4+}$, $Zr^{3+}$, $Zr^{2+}$, $Hf^{4+}$, $Hf^{3+}$, $V^{4+}$, $V^{3+}$, $V^{2+}$, $Nb^{4+}$, $Nb^{4+}$, $Nb^{3+}$, $Nb^{2+}$, $Ta^{4+}$, $Ta^{3+}$, $Ta^{2+}$, $Cr^{4+}$, $Cr^{3+}$, $Cr^{2+}$, $Cr^+$, $Mo^{4+}$, $Mo^{3+}$, $Mo^{2+}$, $Mo^+$, $W^{4+}$, $W^{3+}$, $W^{2+}$, $W^+$, $Mn^{4+}$, $Mn^{3+}$, $Mn^{2+}$, $Mn^+$, $Re^{4+}$, $Re^{3+}$, $Re^{2+}$, $Re^+$, $Fe^{6+}$, $Fe^{4+}$, $Fe^{3+}$, $Fe^{2+}$, $Fe^+$, $Ru^{4+}$, $Ru^{3+}$, $Ru^{2+}$, $Os^{4+}$, $Os^{3+}$, $Os^{2+}$, $Os^+$, $Co^{5+}$, $Co^{4+}$, $Co^{3+}$, $Co^{2+}$, $Co^+$, $Rh^{4+}$, $Ru^{3+}$, $Rh^{2+}$, $Rh^+$, $Ir^+$, $Ir^{3+}$, $Ir^{2+}$, $Ir^+$, $Ni^{3+}$, $Ni^{2+}$, $Ni^+$, $Pd^{4+}$, $Pd^{2+}$, $Pd^+$, $Pt^{4+}$, $Pt^{3+}$, $Pt^{2+}$, $Pt^+$, $Cu^{4+}$, $Cu^{3+}$, $Cu^{2+}$, $Cu^+$, $Ag^{3+}$, $Ag^{2+}$, $Ag^+$, $Au^{4+}$, $Au^{3+}$, $Au^{2+}$, $Au^+$, $Zn^{2+}$, $Zn^+$, $Cd^{2+}$, $Cd^+$, $Hg^{4+}$, $Hg^{2+}$, $Hg^+$, $Al^{3+}$, $Al^{2+}$, $Al^+$, $Ga^{3+}$, $Ga^+$, $In^{3+}$, $In^{2+}$, $Tl^{3+}$, $Tl^+$, $Si^{4+}$, $Si^{3+}$, $Si^{2+}$, $Si^+$, $Ge^{4+}$, $Ge^{3+}$, $Ge^{2+}$, $Ge^+$, $Sn^{4+}$, $Sn^{2+}$, $Pb^{4+}$, $Pb^{2+}$, $As^{3+}$, $As^{2+}$, $As^+$, $Sb^{3+}$, $Bi^{3+}$, $Te^{4+}$, $Te^{2+}$, $La^{3+}$, $La^{2+}$, $Ce^{4+}$, $Ce^{3+}$, $Ce^{2+}$, $Pr^{4+}$, $Pr^{3+}$, $Pr^{2+}$, $Nd^{3+}$, $Nd^{2+}$, $Sm^{3+}$, $Sm^{2+}$, $Eu^{3+}$, $Eu^{2+}$, $Gd^{3+}$, $Gd^{2+}$, $Gd^+$, $Tb^{4+}$, $Tb^{3+}$, $Tb^{2+}$, $Tb^+$, $Db^{3+}$, $Db^{4+}$, $Ho^{3+}$, $Er^{3+}$, $Tm^{4+}$, $Tm^{3+}$, $Tm^{2+}$, $Yb^{3+}$, $Yb^{2+}$, and $Lu^{3+}$. Particularly useful are those which form stable salts, i.e., which do not decompose by more than a minor amount over the expected lifetime and operating conditions of the lubricating composition.

In some embodiments, the metal cation may be supplied in the form of one or more of the alkali or alkaline metal containing detergents discussed in further detail below.

The cation may be an ash-fee (ashless) organic cation; that is an organic ion that does not contain ash-forming metals. Ashless anions may include nitrogen containing compounds, such as ammonium compounds.

Example ammonium cations are of the general form $N(R^{11}R_{12}R_{13}R^{14})^+$ where $R^{11}$, $R^{12}$, $R^{13}$, $R^{14}$ can independently be H or a hydrocarbyl group, as described above. Any two of $R^{11}$, $R^{12}R^{13}$, $R^{14}$ may also be two ends of a single carbon chain wherein the amine is part of a cyclic structure. In one embodiment, the ammonium cation is an unsubstituted ammonium cation ($NH_4^+$). In another embodiment, $R^{11}$ is H and one or more of $R^{12}$, $R^{13}$, $R^{14}$ is a hydrocarbyl group.

When the cation is an ammonium cation derived from an amine or ammonium compound, the ammonium cation (or the amine from which it is derived) may have molecular weight of at least 260 g/mol, or at least 300 g/mol or at least 350 g/mol, or at least 500 g/mol. The solubility of the compound is increased, allowing the concentration of the ionic borate compound in the lubricating composition to be at least 0.5 wt. %, or at least 1 wt. %, or at least 1.5 wt. %, or at least 2 wt. % or at least 4.5 wt. % up to 10 wt. % or 8 wt. % or 6 wt. %

The ammonium cation may be derived from a mono-, di-, or tri-substituted amine, which may be branched or unbranched. Each alkyl group may independently have, for example, from 1-32, or 1-24, or 1-12, or 1-8 carbon atoms and in some embodiments, at least one or at least two of the alkyl groups may have at least 6 or at least 8 carbon atoms. Specific examples include primary alkylamines, such as methylamine, ethylamine, n-propylamine, n-butylamine, n-hexylamine, n-octylamine, 2-ethylhexylamine, benzylamine, 2-phenylethylamine, cocoamine, oleylamine, and tridecylamine (CAS # 86089-17-0); secondary and tertiary alkylamines such as isopropylamine, sec-butylamine, t-butylamine, cyclopentylamine, cyclohexylamine, and 1-phenylethylamine; dialkylamines, such as dimethylamine, diethylamine, dipropylamine, diisopropylamine, dibutylamine, dicyclohexylamine, di-(2-ethylhexyl)amine, dihexylamine, ethylbutylamine, N-ethylcyclohexylamine, and N-methylcyclohexylamine; cycloalkylamines, such as piperidine, N-ethylpiperidine, N,N"-dimethylpiperazine, morpholine, N-methylmorpholine, N-ethylmorpholine, N-methylpiperidine, pyrrolidine, N-methylpyrrolidine, and N-ethylpyrrolidine; trialkylamines, such as trimethylamine, triethylamine, tripropylamine, triisopropylamine, tributylamines, such as tri-n-butylamine, trihexylamines, triheptylamines, trioctylamines, such as tris(2-ethylhexyl)amine, N,N-dimethylbenzylamine, dimethylethylamine, dimethylisopropylamine, dimethylbutylamine, and N,N-dimethylcyclohexylamine.

When the ammonium ion includes at least one hydrocarbyl group (a quaternary ammonium ion), the ammonium cation may be an ashless organic ion. Example ammonium cations of this type include N-substituted long chain alkenyl succinimides and aliphatic polyamines. N-substituted long chain alkenyl succinimides useful herein may be derived from an aliphatic polyamine, or mixture thereof. The aliphatic polyamine may be aliphatic polyamine such as an ethylenepolyamine, a propylenepolyamine, a butylenepolyamine, or mixture thereof. Examples of N-substituted long chain alkenyl succinimides include polyisobutylene succinimide with number average molecular weight of the polyisobutylene substituent of at least 350, or at least 500, or at least 550, or at least 750, and can be up to 5000, or up to 3000, or up to 2500. Such succinimides can be formed, for example, from high vinylidene polyisobutylene and maleic anhydride.

Example N-substituted long chain alkenyl succinimides useful herein as ammonium cations include those derived from succinimide dispersants, which are more fully described in U.S. Pat. Nos. 3,172,892, 3,219,666, 3,316,177, 3,340,281, 3,351,552, 3,381,022, 3,433,744, 3,444,170, 3,467,668, 3,501,405, 3,542,680, 3,576,743, 3,632,511, 4,234,435, Re 26,433, and 6,165,235, 7,238,650 and EP Patent Application 0 355 895 A.

Example aliphatic polyamines useful as the ammonium ion include ethylenepolyamines, propylenepolyamines, butylenepolyamines, and mixtures thereof. Example ethylenepolyamines include ethylenediamine, diethylenetriamine, triethylenetetramine, tetraethylenepentamine, pentaethylene-hexamine, polyamine still bottoms, and mixtures thereof.

Example phosphonium cations are of the general form $P(R^{14}R^{15}R^{16}R^{17})^+$ where $R^{14}$, $R^{15}$, $R^{16}$, $R^{17}$ are independently a hydrocarbyl group, as described above. When the phosphonium cation includes at least one hydrocarbyl group, the phosphonium cation may be an ashless organic ion.

Total base number (TBN) is the quantity of acid, expressed in terms of the equivalent number of milligrams of potassium hydroxide (meq KOH), that is required to neutralize all basic constituents present in 1 gram of a sample of the lubricating oil. The TBN may be determined according to ASTM Standard D2896-11, "Standard Test Method for Base Number of Petroleum Products by Potentiometric Perchloric Acid Titration" (2011), ASTM International, West Conshohocken, Pa., 2003 DOI: 10.1520/D2896-11 (hereinafter, "D2896").

The cation may serve as a basic component of the lubricating composition which, in combination with any basic components which have not formed a coordinate with the bidentate di-oxo ligand, may provide the ionic borate compound/reaction mixture and/or lubricating composition with a total base number of at least 5, or at least 8, or at least 10, or at least 15, or at least 25, as measured by D2896. The cation itself may have a TBN of at least 10 or at least or at least 15, or at least 25, or at least 50 as measured by D2896. Unless otherwise noted, TBN is as determined by this method.

The ability of a compound to deliver TBN as measured by both ASTM D4739-11 ("Standard Test Method for Base Number Determination by Potentiometric Hydrochloric Acid Titration," DOI: 10.1520/D4739-11, hereinafter, "D4739") and D2896 may be desired. Many amines deliver TBN as measured by D2896 but not as measured by D4739. In one embodiment, the cation TBN is measured by both D4739 and D2896. In one embodiment, the reaction product has a TBN as measured by D4739 of at least 5, or at least 10, or at least 15. Compounds which are amine salts of an amine having a molecular weight of at least 260 g/mol (or where the cation has such a molecular weight) are particularly useful in providing a lubricating composition with a high TBN.

Specific examples of such amine and ammonium compounds which have molecular weight of at least 260 g/mol include polyisobutylene derived succinimide dispersants wherein the polyisobutylene may be 1000 Mn and the succinimide amine is a polyethylenepolyamine (Mn 1700 g/mol); decylanthranilate (Mn 277 g/mol); nonylated diphenylamine (Mn ~300 g/mol); N,N-dicocoamine (Mn ~380 g/mol); tetrabutylammonium; Mannich amines (0404.1/2); trimethylcetylammonium, and combinations thereof. Particularly useful amines include amines wherein the pKa of the protonated amine is >5.

In some embodiments, the ionic borate compound is metal free and thus excludes metal cations or includes them in a trace amount which does not appreciably affect the character of the composition, such as a total of less than 5 mole %, or less than 1 mole % of the cations M present in the ionic borate compound.

In some embodiments, the ionic borate compound includes at least one second anion, the second anion being an anion other than a four-coordinate (tetrahedral) borate anion, as described above. The borate compound may thus be of the general form:

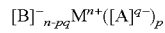

where $[A]^-$ represents the second anion, $q \geq 1$, $p \geq 1$, and $n-pq \geq 1$.

For example, the cation M may be a metal cation, such as $Ca^{2+}$ and the second anion [A] may be a sulfonate alkylsalicylate; phenate; salixarate; saligenin; glyoxylate; or aliphatic carboxylate anions and combinations thereof.

In one embodiment, the ionic borated compound includes an ionic tetrahedral borate compound including a tetrahedral borate anion having a boron atom with two bidentate di-oxo ligands both being a linear $C_{18}$-tartrimide; a first dispersant comprising a conventional ammonium substituted polyisobutenyl succinimide compound having a polyisobutenyl number average molecular weight of 750 to 2,500 and a second dispersant comprising an ammonium substituted polyisobutenyl succinimde compound having an N:CO ratio of 1.8 and a polyisobutylenyl number average molecular weight of 750 to 2,500. Further, in such an embodiment, one or more of the first dispersant and the second dispersant are in cationic form. As used herein, the term "conventional" refers to an ammonium substituted polyisobutenyl succinimide made by the chorine-assisted process. Such a process is well known in the art. One such process includes grafting maleic anhydride to polyisobutenyl in the presence of chorine followed by reaction with a poly(amine) to form the imide.

In another embodiment, the ionic tetrahedral borate compound may be represented by the following Formula III:

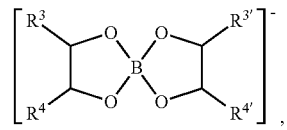

Formula III wherein,

R3 and R4 form a 5-membered nitrogen containing ring substituted with a linear $C_{18}$ group.

B. Oil of Lubricating Viscosity

The lubricating composition may include the oil of lubricating viscosity as a minor or major component thereof, such as at least 5 wt. %, or at least 10 wt. %, or at least 20 wt. %, or at least 30 wt. %, or at least 40 wt. %, or at least 60 wt. %, or at least 80 wt. % of the lubricating composition.

Suitable oils include natural and synthetic oils, oil derived from hydrocracking, hydrogenation, and hydrofinishing, unrefined, refined, re-refined oils or mixtures thereof. Unrefined, refined and re-refined oils, and natural and synthetic oils are described, for example, in WO2008/147704 and US Pub. No. 2010/197536. Synthetic oils may also be produced by Fischer-Tropsch reactions and typically may be hydroisomerized Fischer-Tropsch hydrocarbons or waxes. Oils may be prepared by a Fischer-Tropsch gas-to-liquid synthetic procedure as well as other gas-to-liquid procedures.

Oils of lubricating viscosity may also be defined as specified in April 2008 version of "Appendix E—API Base Oil Interchangeability Guidelines for Passenger Car Motor Oils and Diesel Engine Oils", section 1.3 Sub-heading 1.3. "Base Stock Categories". The API Guidelines are also summarized in U.S. Pat. No. 7,285,516. The five base oil groups are as follows: Group I (sulfur content >0.03 wt. %, and/or <90 wt. % saturates, viscosity index 80-120); Group II (sulfur content ≤0.03 wt. %, and ≥90 wt. % saturates, viscosity index 80-120); Group III (sulfur content ≤0.03 wt. %, and ≥90 wt. % saturates, viscosity index ≥120); Group IV (all polyalphaolefins (PAOs)); and Group V (all others not included in Groups I, II, III, or IV). The exemplary oil of lubricating viscosity includes an API Group I, Group II, Group III, Group IV, Group V oil, or mixtures thereof. In some embodiments, the oil of lubricating viscosity is an API Group I, Group II, Group III, or Group IV oil, or mixtures thereof. In some embodiments, the oil of lubricating viscosity is an API Group I, Group II, or Group III oil, or mixture thereof. In one embodiment the oil of lubricating viscosity may be an API Group II, Group III mineral oil, a Group IV synthetic oil, or mixture thereof. In some embodiments, at least 5 wt. %, or at least 10 wt. %, or at least 20 wt. %, or at least 40 wt. % of the lubricating composition is a polyalphaolefin (Group IV).

The oil of lubricating viscosity may have a kinematic viscosity of up to 30 mm$^2$/s or up to 15 mm$^2$/s (cSt) at 100° C. and can be at least 15 mm$^2$/s at 100° C., and in other embodiments 1-12 or 2-10 or 3-8 or 4-6 mm$^2$/s. As used herein, kinematic viscosity is determined at 100° C. by ASTM D445-14, "Standard Test Method for Kinematic Viscosity of Transparent and Opaque Liquids (and Calculation of Dynamic Viscosity)," ASTM International, West Conshohocken, Pa., 2003, DOI: 10.1520/D0445-14 ad may be referred to as KV_100. The dispersant viscosity modifier may have a KV_100 of at least 35 mm$^2$/s, or at least 100 mm$^2$/s, or at least 500 mm$^2$/s.

In certain embodiments, the lubricating composition may contain synthetic ester base fluids. Synthetic esters may have a kinematic viscosity measured at 100° C. of 2.5 mm$^2$/s to 30 mm$^2$/s. In one embodiment, the lubricating composition comprises less than 50 wt. % of a synthetic ester base fluid with a KV_100 of at least 5.5 mm$^2$/s, or at least 6 mm$^2$/s, or at least 8 mm$^2$/s.

Exemplary synthetic oils include poly-alpha olefins, polyesters, poly-acrylates, and poly-methacrylates, and co-polymers thereof. Example synthetic esters include esters of a dicarboxylic acid (e.g., selected from phthalic acid, succinic acid, alkyl succinic acids, alkenyl succinic acids, maleic acid, azelaic acid, suberic acid, sebacic acid, fumaric acid, adipic acid, linoleic acid dimer, malonic acid, alkyl malonic acids, and alkenyl malonic acids) with an alcohol (e.g., selected from butyl alcohol, hexyl alcohol, dodecyl alcohol, 2-ethylhexyl alcohol, ethylene glycol, diethylene glycol monoether, and propylene glycol). Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid.

Esters useful as synthetic oils also include those made from $C_5$ to $C_{12}$ monocarboxylic acids and polyols and from polyol ethers such as neopentyl glycol, trimethylolpropane, pentaerythritol, dipentaerythritol, and tripentaerythritol. Esters can also be monoesters, such as are available under the trade name Priolube 1976™ ($C_{18}$-alkyl-COO—$C_{20}$ alkyl).

Synthetic ester base oils may be present in the lubricating composition of the invention in an amount less than 50 wt. % of the composition, or less than 40 weight %, or less than 35 weight %, or less than 28 weight %, or less than 21 weight %, or less than 17 weight %, or less than 10 weight %, or less than 5 weight % of the composition. In one embodiment, the lubricating composition of the invention is free of, or substantially free of, a synthetic ester base fluid having a KV_100 of at least 5.5 mm$^2$/s.

Example natural oils include animal and vegetable oils, such as long chain fatty acid esters. Examples include linseed oil, sunflower oil, sesame seed oil, beef tallow oil, lard oil, palm oil, castor oil, cottonseed oil, corn oil, peanut oil, soybean oil, olive oil, whale oil, menhaden oil, sardine oil, coconut oil, palm kernel oil, babassu oil, rape oil, and soya oil.

The amount of the oil of lubricating viscosity present is typically the balance remaining after subtracting from 100 weight % the sum of the amount of the exemplary ionic borate compound and the other performance additives.

The lubricating composition may be in the form of a concentrate and/or a fully formulated lubricant. If the lubricating composition (comprising the ionic borate compound disclosed herein) is in the form of a concentrate which may be combined with additional oil to form, in whole or in part, a finished lubricant, the ratio of ionic borate compound to the oil of lubricating viscosity may be in the range, by weight, of 0.1:99.9 to 99:1, or 1:99 to 90:10, or 10:90 to 80:20.

The lubricating composition comprising the ionic borate compound may have a kinematic viscosity of 2 cSt to 20 cSt at 100° C., as measured by ASTM D445-14. The lubricating composition is liquid, i.e., not a gel or semi-solid, at ambient temperatures (5-30° C.).

Method of Forming the Composition

A lubricating composition may be prepared by adding the ionic borate compound to an oil of lubricating viscosity, optionally in the presence of other performance additives (as described herein below), or by adding reagents for forming the ionic borate compound to an oil of lubricating viscosity or suitable diluent so that the ionic borate compound is formed in the oil of lubricating viscosity in situ.

The ionic borate compound may be formed under basic conditions. Basic conditions are such that compounds that are basic, as determined by D2896, are present in sufficient quantity to react with acidic (i.e., abstractable) protons on the borate complex to allow formation of the tetrahedral complex.

In one embodiment, to form the ionic borate compound, an aliphatic di-hydroxyl compound capable of forming a bidentate di-oxo ligand is combined with a trivalent boron compound and a counterion in sufficient amount to convert some or all of the trivalent boron compound to the ionic borate compound.

In one embodiment, the reactants may be combined in the oil of lubricating viscosity.

According to another embodiment, the ionic borate compound may be formed by means of blending the aliphatic di-hydroxyl compound and trivalent boron compound, in an organic solvent, preferably an alcohol solvent. The addition of a base will generally accelerate the reaction. In some embodiments, the solvent may be selected as a solvent into which at least one, and preferably both the di-hydroxyl and trivalent boron compounds are substantially or substantially completely soluble. Over the course of the reaction, the temperature may be adjusted to promote the reaction, and the water produced by the reaction of the aliphatic di-hydroxyl compound and trivalent boron compound may be azeotropically distilled off with a portion of the solvent medium. The solvent medium may be subsequently separated from the water and returned to the reaction chamber, by means of processes known to those of skill in the art. Beneficially, this process may be employed in the absence of foam inhibitors, which are commonly employed to reduce foam caused by water emissions when, in an alternate embodiment, the reaction is carried out in an oil medium.

Useful solvents for the solvent processing described above may include solvents generally selected from those that will azeotrope with water at process reaction temperatures. Alcohol solvents are particularly useful and may include, but are not limited to methanol, ethanol, propanol, butanol, and pentanol, with butanol and pentanol being particularly useful. In some embodiments, the solvent may be an ether solvent, ester solvent, ketone solvent or blend thereof. Solvents may have a boiling point in the range of about 100° C. to 170° C.

In still another embodiment, the ionic borate compound may be formed by means of the solvent process described above, but wherein the aliphatic di-hydroxyl compound is formed in situ. By this process, the reactive substituents of the aliphatic di-hydroxyl compound may be admixed in the alcohol solvent, along with (or separately from) the trivalent boron compound. In one embodiment, demonstrated in the example below as Solvent Process Procedure 1, the reactive substituents of the di-hydroxyl compound may be admixed in the solvent medium after or concurrent with the addition of the trivalent boron compound. In another embodiment, demonstrated in the example below as Solvent Process Procedure 2, the reactive substituents giving rise to the di-hydroxyl compound may be admixed in the solvent medium and reacted before addition of the trivalent boron compound.

In general, the solvent process described may be conducted at temperatures within the range of about 100° to 170° C. The temperature of the reaction process will be monitored and adjusted as appropriate to facilitate the formation of the di-hydroxyl compound and the formation of the ionic tetrahedral borate compound.

A useful molar ratio of the aliphatic di-hydroxyl compound, trivalent boron compound, and counterion charge used in forming the combination and/or reaction product may be about 1:1:1 to about 2:1:1. A molar ratio of the aliphatic di-hydroxyl compound to trivalent boron compound used in forming the combination and/or reaction product may be from 4:1 to 1:2, such as from 2:1 to 1:2, and the molar ratio of the trivalent boron compound to counterion (e.g., alkyl amine, metal detergent) used in forming the combination and/or reaction product may be from 1:2 to 2:1.

Suitable aliphatic di-hydroxyl compounds useful in forming the ionic tetrahedral borate compounds of the present invention include aliphatic vicinal diols, preferably 1,2 vicinal diols and compounds derived from aliphatic hydroxyacids or aliphatic di- or poly acids, particularly those derivatives that retain at least two reactive hydroxyl groups. For purposes of clarity, a reactive hydroxyl group may include and refer to any reactive —OH group including the —OH moiety of a carboxyl group.

Suitable aliphatic 1,2 vicinal diols may include branched or unbranched compounds having 2 to 150 carbons, or 2 to 50 carbons or 2 to 30 carbons or 2 to 20 carbons. The aliphatic 1,2 vicinal diol may include monoalkyl glycols, monoalkyl glycerols, or monoacyl glycerols.

The monoalkyl glycol may be represented by the following structure A:

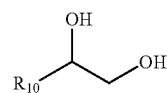

Structure A wherein $R_{10}$ is a hydrogen or substituted or unsubstituted aromatic group, a branched or unbranched hydrocarbyl group having 1 to 250 carbon atoms, or 1 to 150 or 1 to 100 or 1 to 50 or 2 to 36 or 4 or 6 or 8 to 30 carbon atoms. $R_{10}$ may be a branched or unbranched alkyl group or alkylene group. Suitable monoalkyl glycols may include, but are not limited to, ethylene glycol, 1,2-propanediol (propylene glycol), 1,2-butanediol, 1,2-pentanediol, 1,2-hexanediol, 1,2-heptanediol, 1,2-octanediol, 1,2-nonanediol, 1,2-decanediol, 1,2-undecanediol, 1,2-dodecanediol, 1,2-tridecanediol, 1,2-tetradecanediol, 1,2-pentadecanediol, 1,2-hexadecanediol, 1,2-heptadecanediol and 1,2-octadecanediol or any other aliphatic 1,2-diol containing 2 to 36 carbon atoms. The monoalkyl glycerol (alternately referenced as a glycerol alkyl ether) may have a structure represented by the following Structure B:

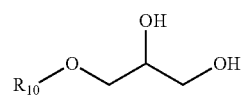

Structure B wherein $R_{10}$ is as previously represented.

The monoacyl glycerol may have a structure represented by Structure C:

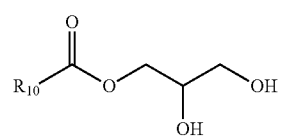

Structure C wherein $R_{10}$ is as previously represented.

In a particularly useful embodiment, the monoacyl glycerol may be glycerol monoleate.

In one embodiment, the aliphatic di-hydroxyl compound may include one or a blend of aliphatic 1,2 vicinal diols. In one embodiment, the aliphatic di-hydroxyl compound may be substantially free of 1,3 diols.

In some embodiments the aliphatic di-hydroxyl compound may be a compound derived from an aliphatic hydroxyl-carboxylic acid or di-acid. Suitable acids will include two reactive hydroxyl groups which may come from 1 to 5 or 2 carboxyl groups on the compound, and from 0 or 1 to 5 or 2 non-carboxyl hydroxyl groups or two carboxyl groups on the compound (as in the case of a di-acid).

Non-hydroxyl di-acids that may be suitable for use in forming the tetrahedral borate compounds of the present invention include oxalic acid and malonic acid.

Hydroxy-carboxylic acids useful as aliphatic di-hydroxyl compounds will have the general formula of or may be represented by Structure D

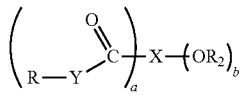

Structure D where a and b are independently integers of 1 to 5; X is an aliphatic or alicyclic group, or an aliphatic or alicyclic group containing an oxygen atom in the carbon chain, or a substituted group of the foregoing types, said group containing up to 6 carbon atoms and having a+b available points of attachment; each Y is independently —O—, >NH, or >NR$^1$ or two Ys together representing the nitrogen of an imide structure R—N<formed between two carbonyl groups; each R and R$^1$ are independently hydrogen or a hydrocarbyl group, provided that at least one R or R$^1$ group is a hydrocarbyl group; each R$^2$ is independently hydrogen, a hydrocarbyl group, or an acyl group, further provided that at least one —OR$^2$ group is located on a carbon atom of X that is α or β to at least one of the —C(—O—)—Y—R groups. Since Y may be oxygen or nitrogen (that is, >NH or NR$^1$), the material will be an ester (that is, an oxygen condensation product), an amide, or an imide (that is, nitrogen condensation products), or mixtures thereof, including diesters, diamides, ester-amides, ester-imides, and other mixed products. As stated above, each R and R$^1$ are independently hydrogen or a hydrocarbyl group, provided that at least one of R or R$^1$ (which may be present if Y is an >NR$^1$ group) is a hydrocarbyl group. The hydrocarbyl group will typically contain 1 to 150 carbon atoms or, in alternative embodiments, 4 to 30 carbon atoms or 6 to 20 or 10 to 20 or 11 to 18 or 8 to 10 carbon atoms.

In the above formula a and b are independently integers of 1 to 5. In certain embodiments at least one of a and b is greater than 1, that is, 2 to 5 or 2 to 4 or 2 to 3 and the other may be 1 or any of the aforementioned ranges. When a and b are both 1, a suitable structure is that based on glycolic acid, HO—CH$_2$—CO$_2$H, that is, where X is the —CH—$_2$— group. The corresponding acid where X is —CH$_2$CH$_2$— is lactic acid, which may also be useful. Such materials may form the corresponding esters and amides. Examples of acids where at least one of a or b is greater than 1 include malic acid (a=2, b=1), tartaric acid (a=2, b=2), and citric acid (a=3, b=1). Those materials for which a is 2 or greater may also exist in the imide form. Mixed materials such as ester amides, ester imides, amide imides, diesters, diamides, diester amide, ester diamides, and diimides may be employed provided that the number of carboxyl groups is appropriately large (and the derivative retains two reactive hydroxyl groups. In one embodiment the aliphatic di-hydroxyl compound may include imides, di-esters, di-amides, di-imides, ester-amides, ester-imides, or imide-amides. In one embodiment the aliphatic di-hydroxyl compound includes imides, di-esters, di-amides, or ester-amides.

The di-esters, di-amides, and ester-amide compounds may be prepared by reacting a dicarboxylic acid (such as tartaric acid), with an amine or alcohol, optionally in the presence of a known esterification catalyst. In the case of ester-imide compounds it is necessary to have at least three carboxylic acid groups (such as citric acid). In the case of a di-imide, it is necessary to have at least four carboxylic acid groups. Examples include esters, amides, and imides of tartaric acid, citric acid, and glycolic acid, and in certain embodiments, tartrates, tartramides, and tartrimides. In particular, oleyl tartrimide has been found to be useful, as well as C$_{12-16}$ alkyl tartrate diesters. C$_{12-16}$ alkyl tartrate diesters may contain a mixture of alkyl groups containing 12, 13, 14, and 15 carbon atoms or combinations thereof. Alkyl groups of 16 carbon atoms may or may not be present in appreciable amounts The C$_{12-16}$ alkyl groups may be either linear or branched, as may also be any of the R or R$^1$ groups.

Among the alcohols which may be reacted are monohydric or polyhydric, linear or branched alcohols. Examples of suitable branched alcohols include 2-ethylhexanol, isotridecanol, Guerbet alcohols, and mixtures thereof. Examples of monohydric alcohol include methanol, ethanol, propanol, butanol, pentanol, hexanol, heptanol, octanol, nonanol, decanol, undecanol, dodecanol, tridecanol, tetradecanol, pentadecanol, hexadecanol, heptadecanol, octadecanol, nonadecanol, eicosanol, or mixtures thereof. In one embodiment the monohydric alcohol contains 5 to 20 carbon atoms. Examples of suitable polyhydric alcohols include ethylene glycol, propylene glycol, 1,3-butylene glycol, 2,3-butylene glycol, 1,5-pentane diol, 1,6-hexane diol, glycerol, sorbitol, pentaerythritol, trimethylolpropane, starch, glucose, sucrose, methylglucoside, or mixtures thereof. In one embodiment a polyhydric alcohol is used in a mixture along with a monohydric alcohol. Typically, in such a combination the monohydric alcohol constitutes at least 60 mole percent, or at least 90 mole percent of the mixture.

Among the suitable X groups, forming, as it were, the core of the molecule, may be —CH$_2$—, —CH$_2$CH$_2$—, >CHCH<(where "<" and ">" represent two bonds to the carbon atoms), >CHCH$_2$—, and >C(CH$_2$—)$_2$, where the bonds are occupied by the appropriate —C(O)YR and —OR$^2$ groups. In an alternative embodiment, the "core" may have a structure reminiscent of a monosaccharide, such as

The —OR$^2$ groups in the above structures may similarly be, independently, hydroxy groups, where R$^2$ is hydrogen, or hydrocarbyl groups of the same type as R or R$^1$ or having, e.g., 1 to 4 carbon atoms, or acyl groups including acyl groups derived from lower carboxylic acids such as those having 1 to 6 carbon atoms such as acetic acid, propionic acid, or butyric acid. In certain embodiments, all the R$^2$ groups are hydrogen.

In some embodiments, at least one of the —OR² groups in the molecule may be located on a carbon atom that is at α or β position to one of the —C(O)—Y—R groups. Thus, for illustration, in glycolic acid (hydroxyacetic acid), the —OH group is on the carbon atom that is a to the carboxy group. In lactic acid, the —OH group is also on the α carbon. In other molecules such as citric acid, there are multiple α and β relationships between the hydroxyl group and the various carboxy groups.

The same chemical structures have also been written in a different format in recent patent applications such as WO2008/147700; see, for instance claim 1 thereof. There the structure has been indicated as

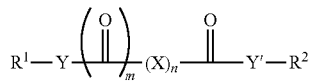

where the $R^1$, $R^2$, Y, Y', X, and other variables are defined in that document so as to correspond to the structures of the present technology, containing acid, ester, amide, or imide groups and alcohol groups.

In one embodiment the aliphatic di-hydroxyl compound is derived from tartaric acid. The tartaric acid used for preparing the tartrates of the invention can be commercially available, and it is likely to exist in one or more isomeric forms such as d-tartaric acid, l-tartaric acid, d,l-tartaric acid, or mesotartaric acid, often depending on the source (natural) or method of synthesis (from maleic acid). For example a racemic mixture of d-tartaric acid and l-tartaric acid is obtained from a catalyzed oxidation of maleic acid with hydrogen peroxide (with tungstic acid catalyst). These derivatives can also be prepared from functional equivalents to the diacid readily apparent to those skilled in the art, such as esters, acid chlorides, or anhydrides.

When the aliphatic di-hydroxyl compound is derived from tartaric acid and one or more alcohols, resultant tartrates may be solid, semi-solid, or oil at 25° C. depending on the particular alcohol used in preparing the tartrate. For use as additives in a lubricating composition, the tartrates are advantageously soluble and/or stably dispersible in such oleaginous compositions. For example, compositions intended for use in oils are typically oil-soluble and/or stably dispersible in an oil in which they are to be used. The term "oil-soluble" as used herein does not necessarily mean that all the compositions in question are miscible or soluble in all proportions in all oils. Rather, it is intended to mean that the composition is soluble in an oil (e.g., mineral, synthetic) in which it is intended to function to an extent which permits the solution to exhibit one or more of the desired properties. Similarly, it is not necessary that such "solutions" be true solutions in the strict physical or chemical sense. They may instead be micro-emulsions or colloidal dispersions which, for the purpose of this invention, exhibit properties sufficiently close to those of true solutions to be, for practical purposes, interchangeable with them within the context of this invention.

When the aliphatic di-hydroxyl compound is a citric acid derivative, examples include trialkyl citrates and borated trialkyl citrates, for instance, triethyl citrate, tripentyl citrate with ethyl dipentyl citrate, borated triethyl citrate, tributyl citrate, triethyl citrate transesterified with 1,2-propandiol, triethyl O-acetyl citrate, triethyl citrate octadecyl succinate, or mixtures thereof. Other suitable citrates include 2-ethylhexyl citrate, dodecyl citrate, or mixtures thereof. A more detailed description of suitable citrates is disclosed in WO 2005/087904 and U.S. Pat. No. 5,338,470.

A detailed description of methods for preparing suitable tartrimides (by reacting tartaric acid with a primary amine) is disclosed in U.S. Pat. No. 4,237,022; see, for instance, columns 4 and 5. In brief, such materials may be prepared by the reaction of tartaric acid and one or more primary amines. The reaction is carried out at temperatures sufficiently high to form the imide, with removal of water of condensation. Suitable temperatures include as 110° C. to 200° C. or 120-180 or 130-165° C. Similar imides may be prepared by reaction of related polycarboxylic acids. The suitable amines will have the formula RNH2 wherein R represents a hydrocarbyl group, typically of 5 to 150 carbon atoms, or 5 to 50 or 6 to 26 or 8 to 18 carbon atoms. Exemplary primary amines include n-hexylamine, n-octylamine (caprylylamine), n-decylamine, n-dodecylamine (laurylamine), n-tetradecylamine (myristylamine), n-pentadecylamine, n-hexadecylamine (palmitylamine), margarylamine, n-octadecylamine (stearylamine), and oleylamine. The amines may be aliphatic amine and may also be saturated or unsaturated and branched or unbranched, although extensive branching at the a carbon (i.e., tertiary alkyl amines) may be less desirable as stearic crowding may inhibit reaction and imide formation. In one example, the imide formed is oleyl tartrimide.

US Patent Application 2005/198894 discloses suitable hydroxycarboxylic acid compounds and methods of preparing the same. Canadian Patent 1183125; US Patent Publication numbers 2006/0183647 and 2006/0079413; PCT application WO2008/067259; and British Patent 2 105 743 A, all disclose examples of suitable tartaric acid derivatives.

In the exemplary embodiment, there is sufficient aliphatic di-hydroxyl compound present such that at least a portion of the trivalent boron compound reacts with 4 hydroxyl groups present in the reaction mixture to form an ion. A ratio by weight of boron in the form of trivalent borate compound to boron in the tetrahedral borate compound in the resulting lubricating composition may be at least 80:20, or at least 90:10, or at least 95:5 or at least 98:2 or at least 99:1. In some embodiments, greater than 50% of the boron in the mixture is converted from the trivalent boron to tetravalent borate anion.

Suitable trivalent boron compounds include borate esters, boric acid, and derivatives thereof. Examples of borate esters and acids are of the general form $B(OR)_3$ where each R is independently selected from H and hydrocarbyl groups of 1 to 48 carbon atoms. Examples include boric acid, trivalent borated hydroxyl esters, such as borated glycerol monooleate (GMO), borated glycerol dioleate (GDO), borated glycerol trioleate (GTO), borated glycerol monococoate (GMC), borated monotalloate (GMT), borated glycerol mono-sorbitate (GMS), borated polyol esters with pendant hydroxyl groups, such as borated pentaerythritol di-$C_8$ ester, tri-hydroxyl orthoborates, borated dispersants, such as borated succinimides, borated detergents, and combinations thereof.

In one embodiment, the counter ion is a basic component, such as a dispersant or detergent or antioxidant which provides the reaction product with a total base number (TBN) of at least 5 (meq KOH/g). The source of the counter ion may be an aminic dispersant or a detergent wherein the TBN is at least 5. For solubilization in mineral oil, particular examples include polyisobutenyl succinimide and polyamine dispersants with high N:CO ratios and with a TBN of at least 5 (mg KOH/g), such as at least 10, or at least 25, and solubilized fatty acid amines, such as stearyl or oleyl amine. Examples of detergent counter ions include overbased and neutral calcium, magnesium or sodium sulfonates, phenates, salicylates, and other detergents described in detail below and as otherwise known to those skilled in the art.

In one embodiment, the ionic borate compound is the reaction product of a tartrimide b) a borate ester, boric acid, or derivative thereof and c) a basic component, such as a dispersant or detergent or antioxidant, to form a "borotartrimide" friction modifier.

In one embodiment, the ionic borate compound is the reaction product of glycerol monoleate b) a borate ester, boric acid, or derivative thereof and c) a basic component, such as a dispersant or detergent or antioxidant, to form a "tetrahedral borated GMO" friction modifier.

These materials can enhance the positive attributes of the three components, while minimizing the negative impact on corrosion and seals degradation. In addition, the combination of these materials can also provide enhancement in durability of performance, that is, the maintenance of positive effects further into the service interval than might otherwise be expected from the individual components.

The lubricating composition may further include additional performance additives other than those which are part of the ionic borate compound, such as detergents, antioxidants, additional dispersants, antiwear agents, and friction modifiers.

C. Other Performance Additives

In addition to the exemplary ionic borate compound(s) disclosed herein, the lubricating composition may further include one or more of the following additional performance additives: detergents, antioxidants, dispersants, viscosity modifiers, antiwear/antiscuffing agents, metal deactivators, friction modifiers, extreme pressure agents, foam inhibitors, demulsifiers, pour point depressants, corrosion inhibitors, seal swelling agents, and the like.

Detergents

The lubricating composition optionally further includes at least one detergent. Exemplary detergents useful herein include overbased metal-containing detergents. The metal of the metal-containing detergent may be zinc, sodium, calcium, barium, or magnesium. The overbased metal-containing detergent may be chosen from sulfonates, non-sulfur containing phenates, sulfur containing phenates, salixarates, salicylates, and mixtures thereof, or borated equivalents thereof. The overbased detergent may be borated with a borating agent such as boric acid.

The overbased metal-containing detergent may also include "hybrid" detergents formed with mixed surfactant systems including phenate and/or sulfonate components, e.g., phenate/salicylates, sulfonate/phenates, sulfonate/salicylates, sulfonates/phenates/salicylates, as described, for example, in U.S. Pat. Nos. 6,429,178; 6,429,179; 6,153,565; and 6,281,179. Where a hybrid sulfonate/phenate detergent is employed, the hybrid detergent can be considered equivalent to amounts of distinct phenate and sulfonate detergents introducing like amounts of phenate and sulfonate soaps, respectively.

Example overbased metal-containing detergents include zinc, sodium, calcium and magnesium salts of sulfonates, phenates (including sulfur-containing and non-sulfur containing phenates), salixarates and salicylates. Such overbased sulfonates, salixarates, phenates and salicylates may have a total base number of 120 to 700, or 250 to 600, or 300 to 500 (on an oil free basis).

The overbased sulfonate detergent may have a metal ratio of 12 to less than 20, or 12 to 18, or 20 to 30, or 22 to 25.

Typically, an overbased metal-containing detergent may be a zinc, sodium, calcium or magnesium salt of a sulfonate, a phenate, sulfur containing phenate, salixarate or salicylate. Overbased sulfonates, salixarates, phenates and salicylates typically have a total base number of 120 to 700 TBN. Overbased sulfonates typically have a total base number of 120 to 700, or 250 to 600, or 300 to 500 (on an oil free basis).

The overbased sulfonate detergent may have a metal ratio of 12 to less than 20, or 12 to 18, or 20 to 30, or 22 to 25.

Example sulfonate detergents include linear and branched alkylbenzene sulfonate detergents, and mixtures thereof, which may have a metal ratio of at least 8, as described, for example, in U.S. Pub. No. 2005065045. Linear alkyl benzenes may have the benzene ring attached anywhere on the linear chain, usually at the 2, 3, or 4 position, or be mixtures thereof. Linear alkylbenzene sulfonate detergents may be particularly useful for assisting in improving fuel economy.

In one embodiment, the alkylbenzene sulfonate detergent may be a branched alkylbenzene sulfonate, a linear alkylbenzene sulfonate, or mixtures thereof.

In one embodiment, the lubricating composition may be free of linear alkylbenzene sulfonate detergent. The sulfonate detergent may be a metal salt of one or more oil-soluble alkyl toluene sulfonate compounds as disclosed in U.S. Pub. No. 20080119378.

The lubricating composition may include at least 0.01 wt. % or at least 0.1 wt. %, detergent, and in some embodiments, up to 2 wt. %, or up to 1 wt. % detergent. Branched alkylbenzenesulfonate detergents may be present in the lubricating composition at 0.1 to 3 wt. %, or 0.25 to 1.5 wt. %, or 0.5 to 1.1 wt. %.

As noted above, in some embodiments, one or more detergents may be selected to provide the counterion of the ionic borate compound.

Antioxidants

The lubricating composition optionally further includes at least one antioxidant. Exemplary antioxidants useful herein include phenolic and aminic antioxidants, such as diarylamines, alkylated diarylamines, hindered phenols, and mixtures thereof. The diarylamine or alkylated diarylamine may be a phenyl-α-naphthylamine (PANA), an alkylated diphenylamine, an alkylated phenylnapthylamine, or mixture thereof. Example alkylated diphenylamines include dinonyl diphenylamine, nonyl diphenylamine, octyl diphenylamine, dioctyl diphenylamine, didecyl diphenylamine, decyl diphenylamine, and mixtures thereof. Example alkylated diarylamines include octyl, dioctyl, nonyl, dinonyl, decyl and didecyl phenylnapthylamines.

Hindered phenol antioxidants often contain a secondary butyl and/or a tertiary butyl group as a steric hindering group. The phenol group may be further substituted with a hydrocarbyl group (e.g., a linear or branched alkyl) and/or a bridging group linking to a second aromatic group. Examples of suitable hindered phenol antioxidants include 2,6-di-tert-butylphenol, 4-methyl-2,6-di-tert-butylphenol, 4-ethyl-2,6-di-tert-butylphenol, 4-propyl-2,6-di-tert-butylphenol, 4-butyl-2,6-di-tert-butylphenol, and 4-dodecyl-2,6-di-tert-butylphenol. In one embodiment, the hindered phenol antioxidant may be an ester, such as those described in U.S. Pat. No. 6,559,105. One such hindered phenol ester is sold as Irganox™ L-135, obtainable from Ciba.

When present, the lubricating composition may include at least 0.1 wt. % or at least 0.5 wt. %, or at least 1 wt. % antioxidant, and in some embodiments, up to 3 wt. %, or up to 2.75 wt. %, or up to 2.5 wt. % antioxidant.

As noted above, in some embodiments, one or more antioxidants may be selected to provide the counterion of the ionic borate compound.

Dispersants

The lubricating composition optionally further includes at least one dispersant other than the exemplary compound. Exemplary dispersants include succinimide dispersants, Mannich dispersants, succinimide dispersants, and polyolefin succinic acid esters, amides, and ester-amides, and mixtures thereof. The succinimide dispersant, where present, may be as described above for the succinimides described as useful for cation M.

The succinimide dispersant may be derived from an aliphatic polyamine, or mixtures thereof. The aliphatic polyamine may be an ethylenepolyamine, a propylenepolyamine, a butylenepolyamine, or a mixture thereof. In one embodiment the aliphatic polyamine may be an ethylenepolyamine. In one embodiment the aliphatic polyamine may be chosen from ethylenediamine, diethylenetriamine, triethylenetetramine, tetra-ethylene-pentamine, pentaethylenehexamine, polyamine still bottoms, and mixtures thereof.

In one embodiment the dispersant may be a polyolefin succinic acid ester, amide, or ester-amide. A polyolefin succinic acid ester-amide may be a polyisobutylene succinic acid reacted with an alcohol (such as pentaerythritol) and a polyamine as described above. Example polyolefin succinic acid esters include polyisobutylene succinic acid esters of pentaerythritol and mixture thereof.

The dispersant may be an N-substituted long chain alkenyl succinimide. An example of an N-substituted long chain alkenyl succinimide is polyisobutylene succinimide. Typically the polyisobutylene from which polyisobutylene succinic anhydride is derived has a number average molecular weight of 350 to 5000, or 550 to 3000 or 750 to 2500. Succinimide dispersants and their preparation are disclosed, for example, in U.S. Pat. Nos. 3,172,892, 3,219,666, 3,316,177, 3,340,281, 3,351,552, 3,381,022, 3,433,744, 3,444,170, 3,467,668, 3,501,405, 3,542,680, 3,576,743, 3,632,511, 4,234,435, Re 26,433, and 6,165,235, and 7,238,650 and EP Patent Application 0 355 895 A.

The succinimide dispersant may comprise a polyisobutylene succinimide, wherein the polyisobutylene from which polyisobutylene succinimide is derived has a number average molecular weight of 350 to 5000, or 750 to 2500.

The exemplary dispersants may also be post-treated by conventional methods by a reaction with any of a variety of agents. Among these are boron compounds (such as boric acid), urea, thiourea, dimercaptothiadiazoles, carbon disulfide, aldehydes, ketones, carboxylic acids such as terephthalic acid, hydrocarbon-substituted succinic anhydrides, maleic anhydride, nitriles, epoxides, and phosphorus compounds. In one embodiment the post-treated dispersant is borated. In one embodiment the post-treated dispersant is reacted with dimercaptothiadiazoles. In one embodiment the post-treated dispersant is reacted with phosphoric or phosphorous acid. In one embodiment the post-treated dispersant is reacted with terephthalic acid and boric acid (as described in U.S. Pub. No. 2009/0054278.

When present, the lubricating composition may include at least 0.01 wt. %, or at least 0.1 wt. %, or at least 0.5 wt. %, or at least 1 wt. % dispersant, and in some embodiments, up to 20 wt. %, or up to 15 wt. %, or up to 10 wt. %, or up to 6 wt. % or up to 3 wt. % dispersant.

As noted above, in some embodiments, one or more dispersants may be selected to provide the counterion of the ionic borate compound.

Anti-Wear Agents

The lubricating composition optionally further includes at least one antiwear agent. Examples of suitable antiwear agents suitable for use herein include titanium compounds, tartrates, tartrimides, oil soluble amine salts of phosphorus compounds, sulfurized olefins, metal dihydrocarbyldithiophosphates (such as zinc dialkyldithiophosphates), phosphites (such as dibutyl phosphite), phosphonates, thiocarbamate-containing compounds, such as thiocarbamate esters, thiocarbamate amides, thiocarbamic ethers, alkylene-coupled thiocarbamates, and bis(S-alkyldithiocarbamyl) disulfides. The antiwear agent may in one embodiment include a tartrate, or tartrimide as described in U.S. Pub. Nos. 2006/0079413; 2006/0183647; and 2010/0081592. The tartrate or tartrimide may contain alkyl-ester groups, where the sum of carbon atoms on the alkyl groups is at least 8. The antiwear agent may, in one embodiment, include a citrate as is disclosed in US Pub. No. 20050198894.

The lubricating composition may in one embodiment further include a phosphorus-containing antiwear agent. Example phosphorus-containing antiwear agents include zinc dialkyldithiophosphates, phosphites, phosphates, phosphonates, and ammonium phosphate salts, and mixtures thereof.

When present, the lubricating composition may include at least 0.01 wt. %, or at least 0.1 wt. %, or at least 0.5 wt. % antiwear agent, and in some embodiments, up to 3 wt. %, or up to 1.5 wt. %, or up to 0.9 wt. antiwear agent.

Oil-Soluble Titanium Compounds

The lubricating composition may include one or more oil-soluble titanium compounds, which may function as antiwear agents, friction modifiers, antioxidants, deposit control additives, or more than one of these functions. Example oil-soluble titanium compounds are disclosed in U.S. Pat. No. 7,727,943 and U.S. Pub. No. 2006/0014651. Example oil soluble titanium compounds include titanium (IV) alkoxides, such as titanium (IV) isopropoxide and titanium (IV) 2 ethylhexoxide. Such alkoxides may be formed from a monohydric alcohol, a vicinal 1,2-diol, a polyol, or mixture thereof. The monohydric alkoxides may have 2 to 16, or 3 to 10 carbon atoms. In one embodiment, the titanium compound comprises the alkoxide of a vicinal 1,2-diol or polyol. 1,2-vicinal diols include fatty acid monoesters of glycerol, where the fatty acid may be, for example, oleic acid. Other example oil soluble titanium compounds include titanium carboxylates, such as titanium neodecanoate.

When present in the lubricating composition, the amount of oil-soluble titanium compounds is included as part of the antiwear agent.

Extreme Pressure (EP) Agents

The lubricating composition may include an extreme pressure agent. Example extreme pressure agents that are soluble in the oil include sulfur- and chlorosulfur-containing EP agents, dimercaptothiadiazole or $CS_2$ derivatives of dispersants (typically succinimide dispersants), derivative of chlorinated hydrocarbon EP agents and phosphorus EP agents. Examples of such EP agents include chlorinated wax; sulfurized olefins (such as sulfurized isobutylene), hydrocarbyl-substituted 2,5-dimercapto-1,3,4-thiadiazoles and oligomers thereof, organic sulfides and polysulfides, such as dibenzyldisulfide, bis-(chlorobenzyl) disulfide, dibutyl tetrasulfide, sulfurized methyl ester of oleic acid, sulfurized alkylphenol, sulfurized dipentene, sulfurized terpene, and sulfurized Diels-Alder adducts; phosphosulfurized hydrocarbons such as the reaction product of phosphorus sulfide with turpentine or methyl oleate; phosphorus esters, such as dihydrocarbon and trihydrocarbon phosphites, e.g., dibutyl phosphite, diheptyl phosphite, dicyclohexyl phosphite, pentylphenyl phosphite; dipentylphenyl phosphite, tridecyl phosphite, distearyl phosphite and polypropylene substituted phenol phosphite; metal thiocarbamates, such as zinc dioctyldithiocarbamate and barium heptylphenol diacid; amine salts of alkyl and dialkylphosphoric acids or derivatives including, for example, the amine salt of a reaction product of a dialkyldithiophosphoric acid with propylene oxide and subsequently followed by a further reaction with $P_2O_5$; and mixtures thereof. Some useful extreme pressure agents are described in U.S. Pat. No. 3,197,405.

When present, the lubricating composition may include at least 0.01 wt. %, or at least 0.1 wt. %, or at least 0.5 wt. % extreme pressure agent, and in some embodiments, up to 3 wt. %, or up to 1.5 wt. %, or up to 0.9 wt. % of the extreme pressure agent.

Foam Inhibitors

The lubricating composition may include a foam inhibitor. Foam inhibitors that may be useful in the lubricant composition include polysiloxanes; copolymers of ethyl acrylate and 2-ethylhexylacrylate and optionally vinyl acetate; demulsifiers including fluorinated polysiloxanes, trialkyl phosphates, polyethylene glycols, polyethylene oxides, polypropylene oxides and (ethylene oxide-propylene oxide) polymers.

Viscosity Modifiers

The lubricating composition may include a viscosity modifier. Viscosity modifiers (also sometimes referred to as viscosity index improvers or viscosity improvers) useful in the lubricant composition are usually polymers, including polyisobutenes, polymethacrylates (PMA) and polymethacrylic acid esters, diene polymers, polyalkylstyrenes, esterified styrene-maleic anhydride copolymers, hydrogenated alkenylarene-conjugated diene copolymers and polyolefins also referred to as olefin copolymer or OCP. PMA's are prepared from mixtures of methacrylate monomers having different alkyl groups. The alkyl groups may be either straight chain or branched chain groups containing from 1 to 18 carbon atoms. Most PMA's are viscosity modifiers as well as pour point depressants. In one embodiment, the viscosity modifier is a polyolefin comprising ethylene and one or more higher olefin, such as propylene.

When present, the lubricating composition may include at least 0.01 wt. %, or at least 0.1 wt. %, or at least 0.3 wt. %, or at least 0.5 wt. % polymeric viscosity modifiers, and in some embodiments, up to 10 wt. %, or up to 5 wt. %, or up to 2.5 wt. % polymeric viscosity modifiers.

Corrosion Inhibitors and Metal Deactivators

The lubricating composition may include a corrosion inhibitor. Corrosion inhibitors/metal deactivators that may be useful in the exemplary lubricating composition include fatty amines, octylamine octanoate, condensation products of dodecenyl succinic acid or anhydride, and a fatty acid such as oleic acid with a polyamine, derivatives of benzotriazoles (e.g., tolyltriazole), 1,2,4-triazoles, benzimidazoles, 2-alkyldithiobenzimidazoles and 2-alkyldithiobenzothiazoles.

Pour Point Depressants

The lubricating composition may include a pour point depressant. Pour point depressants that may be useful in the exemplary lubricating composition include polyalphaolefins, esters of maleic anhydride-styrene copolymers, polymethacrylates, polyacrylates, and polyacrylamides.

Friction Modifiers

The lubricating composition may include a friction modifier other than those that are described as the subject of the present invention. Friction modifiers that may be useful in the exemplary lubricating composition include fatty acid derivatives such as amines, esters, epoxides, fatty imidazolines, condensation products of carboxylic acids and polyalkylene-polyamines and amine salts of alkylphosphoric acids.

The friction modifier may be an ash-free friction modifier. Such friction modifiers are those which typically not produce any sulfated ash when subjected to the conditions of ASTM D 874. An additive is referred to as "non-metal containing" if it does not contribute metal content to the lubricant composition. As used herein the term "fatty alkyl" or "fatty" in relation to friction modifiers means a carbon chain having 8 to 30 carbon atoms, typically a straight carbon chain.

In one embodiment ash-free friction modifier may be represented by the formula

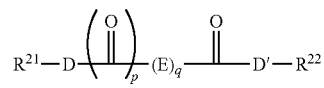

where, D and D' are independently selected from —O—, >NH, >NR$^{23}$, an imide group formed by taking together both D and D' groups and forming a R$^{21}$—N< group between two >C=O groups; E is selected from —R$^{24}$—O—R$^{25}$—, >CH$_2$, >CHR$^{26}$, >CR$^{26}$R$^{27}$, >C(OH)(CO$_2$R$^{22}$), >C(CO$_2$R$^{22}$)$_2$, and >CHOR$^{28}$; where R$^{24}$ and R$^{25}$ are independently selected from >CH$_2$, >CHR$^{26}$, >CR$^{26}$R$^{27}$, >C(OH)(CO$_2$R$^{22}$), and >CHOR$^{28}$; q is 0 to 10, with the proviso that when q=1, E is not >CH$_2$, and when n=2, both Es are not >CH$_2$; p is 0 or 1; R$^{21}$ is independently hydrogen or a hydrocarbyl group, typically containing 1 to 150 carbon atoms, with the proviso that when R$^{21}$ is hydrogen, p is 0, and q is more than or equal to 1; R$^{22}$ is a hydrocarbyl group, typically containing 1 to 150 carbon atoms; R$^{23}$, R$^{24}$, R$^{25}$, R$^{26}$ and R$^{27}$ are independently hydrocarbyl groups; and R$^{28}$ is hydrogen or a hydrocarbyl group, typically containing 1 to 150 carbon atoms, or 4 to 32 carbon atoms, or 8 to 24 carbon atoms. In certain embodiments, the hydrocarbyl groups R$^{23}$, R$^{24}$, R$^{25}$, may be linear or predominantly linear alkyl groups.

In certain embodiments, the ash-free friction modifier is a fatty ester, amide, or imide of various hydroxy-carboxylic acids, such as tartaric acid, malic acid lactic acid, glycolic acid, and mandelic acid. Examples of suitable materials include tartaric acid di(2-ethylhexyl)ester (i.e., di(2-ethylhexyl)tartrate), di(C$_8$-C$_{10}$)tartrate, di(C$_{12-15}$)tartrate, dioleyl tartrate, oleyl tartrimide, and oleyl malimide.

In certain embodiments, the ash-free friction modifier may be chosen from long chain fatty acid derivatives of amines, fatty esters, or fatty epoxides; fatty imidazolines such as condensation products of carboxylic acids and polyalkylene-polyamines; amine salts of alkylphosphoric acids; fatty alkyl tartrates; fatty alkyl tartrimides; fatty alkyl tartramides; fatty phosphonates; fatty phosphites; borated phospholipids, borated fatty epoxides; glycerol esters; borated glycerol esters; fatty amines; alkoxylated fatty amines; borated alkoxylated fatty amines; hydroxyl and polyhydroxy fatty amines including tertiary hydroxy fatty amines; hydroxy alkyl amides; metal salts of fatty acids; metal salts of alkyl salicylates; fatty oxazolines; fatty ethoxylated alcohols; condensation products of carboxylic acids and polyalkylene polyamines; or reaction products from fatty carboxylic acids with guanidine, aminoguanidine, urea, or thiourea and salts thereof.

Friction modifiers may also encompass materials such as sulfurized fatty compounds and olefins, sunflower oil or soybean oil monoester of a polyol and an aliphatic carboxylic acid.

In another embodiment the friction modifier may be a long chain fatty acid ester. In another embodiment the long chain fatty acid ester may be a monoester and in another embodiment the long chain fatty acid ester may be a triglyceride.

The amount of the ash-free friction modifier in a lubricant may be 0.1 to 3 percent by weight (or 0.12 to 1.2 or 0.15 to 0.8 percent by weight). The material may also be present in a concentrate, alone or with other additives and with a lesser amount of oil. In a concentrate, the amount of material may be two to ten times the above concentration amounts.

Molybdenum compounds are also known as friction modifiers. The exemplary molybdenum compound does not contain dithiocarbamate moieties or ligands.

Nitrogen-containing molybdenum materials include molybdenum-amine compounds, as described in U.S. Pat. No. 6,329,327, and organomolybdenum compounds made from the reaction of a molybdenum source, fatty oil, and a diamine as described in U.S. Pat. No. 6,914,037. Other molybdenum compounds are disclosed in U.S. Pub. No. 20080280795. Molybdenum amine compounds may be obtained by reacting a compound containing a hexavalent molybdenum atom with a primary, secondary or tertiary amine represented by the formula $NR^{29}R^{30}R^{31}$, where each of $R^{29}$, $R^{30}$ and $R^{31}$ is independently hydrogen or a hydrocarbyl group of 1 to 32 carbon atoms and wherein at least one of $R^{29}$, $R^{30}$ and $R^{31}$ is a hydrocarbyl group of 4 or more carbon atoms or represented by the formula

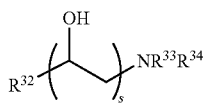

where $R^{32}$ represents a chain hydrocarbyl group having 10 or more carbon atoms, s is 0 or 1, $R^{33}$ and/or $R^{34}$ represents a hydrogen atom, a hydrocarbyl group, an alkanol group or an alkyl amino group having 2 to 4 carbon atoms, and when s=0, both $R^{33}$ and $R^{34}$ are not hydrogen atoms or hydrocarbon groups.

Specific examples of suitable amines include monoalkyl (or alkenyl) amines such as tetradecylamine, stearylamine, oleylamine, beef tallow alkylamine, hardened beef tallow alkylamine, and soybean oil alkylamine; dialkyl(or alkenyl) amines such as N-tetradecylmethylamine, N-pentadecylmethylamine, N-hexadecylmethylamine, N-stearylmethylamine, N-oleylmethylamine, N-dococylmethylamine, N-beef tallow alkyl methylamine, N-hardened beef tallow alkyl methylamine, N-soybean oil alkyl methylamine, ditetradecylamine, dipentadecylamine, dihexadecylamine, distearylamine, dioleylamine, dicocoylamine, bis(2-hexyldecyl)amine, bis(2-octyldodecyl)amine, bis(2-decyltetradecyl)amine, beef tallow dialkylamine, hardened beef tallow dialkylamine, and soybean oil dialkylamine; and trialk(en)ylamines such as hexadecyldimethylamine, octadecyldimethylamine, beef tallow alkyldimethylamine, hardened beef tallow alkyldimethylamine, soybean oil alkyldimethylamine, dioleylmethylamine, tritetradecylamine, tristearylamine, and trioleylamine. Suitable secondary amines have two alkyl (or alkenyl) groups with 14 to 18 carbon atoms.

Examples of the compound containing the hexavalent molybdenum atom include molybdenum trioxides or hydrates thereof ($MoO_3 \cdot nH_2O$), molybdenum acid ($H_2MoO_4$), alkali metal molybdates ($Q_2MO_4$) wherein Q represents an alkali metal such as sodium and potassium, ammonium molybdates $\{(NH_4)_2MoO_4$ or heptamolybdate $(NH_4)_6[Mo_7O_{24}] \cdot 4H_2O\}$, $MoOCl_4$, $MoO_2Cl_2$, $MoO_2Br_2$, $Mo_2O_3Cl_6$ and the like. Molybdenum trioxides or hydrates thereof, molybdenum acid, alkali metal molybdates and ammonium molybdates are often suitable because of their availability. In one embodiment, the lubricating composition comprises molybdenum amine compound.

Other organomolybdenum compounds of the invention may be the reaction products of fatty oils, mono-alkylated alkylene diamines and a molybdenum source. Materials of this sort are generally made in two steps, a first step involving the preparation of an aminoamide/glyceride mixture at high temperature, and a second step involving incorporation of the molybdenum.

Examples of fatty oils that may be used include cottonseed oil, groundnut oil, coconut oil, linseed oil, palm kernel oil, olive oil, corn oil, palm oil, castor oil, rapeseed oil (low or high erucic acids), soyabean oil, sunflower oil, herring oil, sardine oil, and tallow. These fatty oils are generally known as glyceryl esters of fatty acids, triacylglycerols or triglycerides.

Examples of some mono-alkylated alkylene diamines that may be used include methylaminopropylamine, methylaminoethylamine, butylaminopropylamine, butylaminoethylamine, octylaminopropylamine, octylaminoethylamine, dodecylaminopropylamine, dodecylaminoethylamine, hexadecylaminopropylamine, hexadecylaminoethylamine, octadecylaminopropylamine, octadecylaminoethylamine, isopropyloxypropyl-1,3-diaminopropane, and octyloxypropyl-1,3-diaminopropane. Mono-alkylated alkylene diamines derived from fatty acids may also be used. Examples include N-coco alkyl-1,3-propanediamine (Duomeen®C), N-tall oil alkyl-1,3-propanediamine (Duomeen®T) and N-oleyl-1,3-propanediamine (Duomeen®O), all commercially available from Akzo Nobel.

Sources of molybdenum for incorporation into the fatty oil/diamine complex are generally oxygen-containing molybdenum compounds include, similar to those above, ammonium molybdates, sodium molybdate, molybdenum oxides and mixtures thereof. One suitable molybdenum source comprises molybdenum trioxide ($MoO_3$).

Nitrogen-containing molybdenum compounds which are commercially available include, for example, Sakuralube®710 available from Adeka which is a molybdenum amine compound, and Molyvan® 855, available from R.T. Vanderbilt.

The nitrogen-containing molybdenum compound may be present in the lubricant composition at 0.005 to 2 wt. % of the composition, or 0.01 to 1.3 wt. %, or 0.02 to 1.0 wt. % of the composition. The molybdenum compound may provide the lubricant composition with 0 to 1000 ppm, or 5 to 1000 ppm, or 10 to 750 ppm 5 ppm to 300 ppm, or 20 ppm to 250 ppm of molybdenum.

Demulsifiers

Demulsifiers useful herein include trialkyl phosphates, and various polymers and copolymers of ethylene glycol, ethylene oxide, propylene oxide, and mixtures thereof.

Seal Swell Agents

Seal swell agents useful herein include sulfolene derivatives, such as Exxon Necton-37™ (FN 1380) and Exxon Mineral Seal Oil™ (FN 3200).

An engine lubricant composition in different embodiments may have a composition as illustrated in Table 1. All additives are expressed on an oil-free basis.

TABLE 1

Examplary Lubricating Compositions

| Additive | Embodiments (wt. %) | | |
|---|---|---|---|
| | A | B | C |
| Ionic Borate Compound | 0.025 to 5.0 | 0.01 to 4.5 | 0.5 to 4.0 |
| Friction Modifier | 0.01 to 6 | 0.05 to 4 | 0.1 to 2 |
| (Borated) Dispersant | 0 to 12 | 0.5 to 8 | 1 to 6 |
| Overbased Detergent | 0 to 9 | 0.5 to 8 | 1 to 5 |
| Corrosion Inhibitor | 0.05 to 2 | 0.1 to 1 | 0.2 to 0.5 |
| Antioxidant | 0.1 to 13 | 0.1 to 10 | 0.5 to 5 |
| Antiwear Agent | 0.1 to 15 | 0.1 to 10 | 0.3 to 5 |
| Viscosity Modifier | 0 to 10 | 0.5 to 8 | 1 to 6 |
| Other Performance Additives | 0 to 10 | 0 to 8 | 0 to 6 |
| Synthetic Ester Base Fluid | 0 to 50 | 0 to 35 | 1 to 25 |
| Oil of Lubricating Viscosity | | Balance to 100% | |

As used herein, "fully formulated" with reference to lubricating compositions refers to a lubricating composition including at least one oil of lubricating viscosity, an ionic tetrahedral borate anion compound represented by Formula III, a first dispersant comprising a conventional ammonium substituted polyisobutenyl succinimide compound having a polyisobutenyl number average molecular weight of 750 to 2,500, a second dispersant comprising an ammonium substituted polyisobutenyl succinimde compound having an N:CO ratio of 1.8 and a polyisobutylenyl number average molecular weight of 750 to 2,500, wherein one or more of the first dispersant and the second dispersant are in cationic form, and at least one or more performance additives. Such performance additives are disclosed herein.

Use of the Lubricating Composition

The end use of the lubricant composition described herein includes but not limited to engine oils, including those used for passenger car, heavy, medium and light duty diesel vehicles, large engines, such as marine diesel engines, small engines such as motorcycle and 2-stoke oil engines, driveline lubricants, including gear and automatic transmission oils, and industrial oils, such as hydraulic lubricants.

An exemplary method of lubricating a mechanical device includes supplying a fully formulated lubricating composition to the device. The mechanical device may include an engine of a vehicle or a driveline device, such as a manual transmission, synchromesh gear box, or axle.

In one embodiment, a use of the ionic boron compound described herein to improve one or more of friction and wear, while maintaining one or more of good corrosion, TBN retention, oxidation and deposits performance and dispersancy performance is provided.

In one embodiment, a method of lubricating an internal combustion engine includes supplying to the internal combustion engine a fully formulated lubricating composition as disclosed herein. Generally, the lubricating composition is added to the lubricating system of the internal combustion engine, which then delivers the lubricating composition to the critical parts of the engine, during its operation, that require lubrication.

The component(s) of an internal combustion engine to be lubricated by the fully formulated lubricating composition may have a surface of steel or aluminum (typically a surface of steel), and may also be coated for example, with a diamond like carbon (DLC) coating. An aluminum surface may comprise an aluminum alloy that may be a eutectic or hyper-eutectic aluminum alloy (such as those derived from aluminum silicates, aluminum oxides, or other ceramic materials). The aluminum surface may be present on a cylinder bore, cylinder block, or piston ring formed of an aluminum alloy or aluminum composite.

The internal combustion engine may or may not have an Exhaust Gas Recirculation system. The internal combustion engine may be fitted with an emission control system or a turbocharger. Examples of the emission control system include diesel particulate filters (DPF), or systems employing selective catalytic reduction (SCR).

The internal combustion engine may be a diesel-fueled engine (such as a heavy duty diesel engine), a gasoline-fueled engine, a natural gas-fueled engine, a mixed gasoline/alcohol-fueled engine, or a biodiesel-fueled engine.

The internal combustion engine may be a 2-stroke or 4-stroke engine. Suitable internal combustion engines include marine diesel engines, aviation piston engines, low-load diesel engines, and automobile and truck engines. In one embodiment the internal combustion engine is a gasoline direct injection (GDI) engine.

The internal combustion engine is distinct from gas turbine. In an internal combustion engine, individual combustion events which through the rod and crankshaft translate from a linear reciprocating force into a rotational torque. In contrast, in a gas turbine (which may also be referred to as a jet engine) it is a continuous combustion process that generates a rotational torque continuously without translation and can also develop thrust at the exhaust outlet. These differences result in the operation conditions of a gas turbine and internal combustion engine different operating environments and stresses.

The fully formulated lubricating composition for an internal combustion engine may be suitable for use as an engine lubricant irrespective of the sulfur, phosphorus or sulfated ash (ASTM D-874) content. The sulfur content of the lubricating composition, which is particularly suited to use as an engine oil lubricant, may be 1 wt. % or less, or 0.8 wt. % or less, or 0.5 wt. % or less, or 0.3 wt. % or less. In one embodiment, the sulfur content may be in the range of 0.001 wt. % to 0.5 wt. %, or 0.01 wt. % to 0.3 wt. %. The phosphorus content may be 0.2 wt. % or less, or 0.12 wt. % or less, or 0.1 wt. % or less, or 0.085 wt. % or less, or 0.08 wt. % or less, or even 0.06 wt. % or less, 0.055 wt. % or less, or 0.05 wt. % or less. In one embodiment, the phosphorus content may be 100 ppm to 1000 ppm, or 200 ppm to 600 ppm. The total sulfated ash content may be 2 wt. % or less, or 1.5 wt. % or less, or 1.1 wt. % or less, or 1 wt. % or less, or 0.8 wt. % or less, or 0.5 wt. % or less, or 0.4 wt. % or less. In one embodiment, the sulfated ash content may be 0.05 wt. % to 0.9 wt. %, or 0.1 wt. % to 0.2 wt. % or to 0.45 wt. %. In one embodiment, the lubricating composition may be an engine oil, wherein the lubricating composition may be characterized as having at least one of (i) a sulfur content of 0.5 wt. % or less, (ii) a phosphorus content of 0.1 wt. % or less, (iii) a sulfated ash content of 1.5 wt. % or less, or combinations thereof.

EXAMPLES

The invention will be further illustrated by the following examples, which set forth particularly advantageous embodiments. While the examples are provided to illustrate the invention, they are not intended to limit it.

A series of tetrahedral borate compounds according to aspects of the invention may be prepared as described in the examples provided below.

Compound Example 1: N-oleyl tartrimide/tris(2-ethylhexyl)borate/polyisobutylene Succinimide-Based Ionic Tetrahedral Borate Compound A mixture comprising an ionic tetrahedral borate compound is formed by blending N-oleyl tartrimide (44.6 g), tris(2-ethylhexyl) borate 32.6 g), and a 100 TBN direct alkylation polyisobutylene succinimide (PIBSA) dispersant (containing 14% diluent oil) (22.8 g), providing a tartrimide:Borate:PIBSA molar ratio of 2:1:1. The PIBSA dispersant is made from a 1000 Mn high vinylidene polyisobutylene and succinic anhydride having an N:CO (m) ratio of 1.79 and a TBN of 100. The reaction is carried out at 80° C. for 2 hours under atmospheric pressure. The product is isolated without further purification.

Compound Example 1a: N-oleyl tartrimide/tris(2-ethylhexyl)borate/polyisobutylene Succinimide-Based Ionic Tetrahedral Borate Compound An ionic tetrahedral borate compound-containing mixture is formed as in Example 1, but the N-oleyl tartrimide (21.9 g) is supplied as a mixture of 60% OT and 40% mineral oil and the PIBSA dispersant is made from a 2000 Mn high vinylidene polyisobutylene and succinic anhydride having an N:CO (m) ratio of 1.79 and a TBN of 13.

Compound Example 2: N-oleyl tartrimide/tris(2-ethylhexyl)borate/Overbased Calcium Sulphonate Detergent-Based Ionic Tetrahedral Borate Compound A mixture comprising an ionic tetrahedral borate compound is formed by blending N-oleyl tartrimide supplied as a mixture of 60% OT and 40% mineral oil (70.8 g), tris(2-ethylhexyl) borate (21.7 g), and a 400 TBN calcium sulphonate detergent (7.5 g), providing a tartrimide:Borate:detergent molar ratio of 2:1:1. The reaction is carried out at 80° C. for 2 hours. The product is isolated without further purification.

Compound Example 3: N-oleyl tartrimide/tris(2-ethylhexyl)borate/Overbased Calcium Sulphonate Detergent-Based Ionic Tetrahedral Borate Compound A mixture comprising an ionic tetrahedral borate compound is formed as in Example 2, except that the reaction is carried out at 100° C. for 2 hours, and the resulting mixture placed under reduced pressure resulting in azeotropic distillation of alcohol (2-ethylhexanol). The product is isolated without further purification.

Compound Example 4: N-oleyl tartrimide/tris(2-ethylhexyl)borate/Neutral Calcium Sulphonate Detergent-Based Ionic Tetrahedral Borate Compound A mixture comprising an ionic tetrahedral borate compound is formed as in Example 2, except using an 85 TBN calcium sulphonate detergent (28.0 g).

Compound Example 5: N-oleyl tartrimide/tris(2-ethylhexyl)borate/phenolic Antioxidant-Based Ionic Tetrahedral Borate Compound A mixture comprising an ionic tetrahedral borate compound is formed as in Example 2, except using 2,6-di-(secbutyl),4-(2-ethylhexylaminomethyl phenol (21.6 g) as base.

Compound Example 6: N-oleyl tartrimide/tris(2-ethylhexyl)borate/Overbased Calcium Sulphonate Detergent-Based Ionic Tetrahedral Borate Compound A mixture comprising an ionic tetrahedral borate compound is formed as described in Example 2, except (11.6 g) of 400 TBN calcium sulphonate detergent are employed, providing a tartrimide:Borate:detergent molar ratio of 1:1:1.

Compound Example 7: N-oleyl tartrimide/tris(2-ethylhexyl)borate/Overbased Calcium Sulphonate Detergent-Based Ionic Tetrahedral Borate Compound A mixture comprising an ionic tetrahedral borate compound is formed as described in Example 3, except (11.6 g) of 400 TBN calcium sulphonate detergent are employed, providing a tartrimide:Borate:detergent molar ratio of 1:1:1.

Compound Example 8: Tetrahedral Borated N-oleyl Tartrimide by Solvent Process Procedure 1 (In Situ Tartrimide Formation in Presence of Boric Acid to Form Tetrahedral Complex)

187.6 g of tartaric acid (1.25 mol, 2.0 eq) and 19.3 g of boric acid (0.31 mol, 0.5 eq) are stirred in 110 g of pentanol and heated to reflux. 334.4 g of oleylamine (1.25 mol, 2.0 eq) is added via an additional funnel. The resulting reaction is held at 140° C. for 5 h. The solvent is then removed via vacuum distillation to yield the final product without further purification. $^{11}$B NMR (160 MHz, $CDCl_3$) ppm: 9.60 (br). Elemental analysis: 0.6% B, 3.2% N.

Compound Example 9: Tetrahedral Borated N-oleyl Tartrimide by Solvent Process Procedure 1

250 g of tartaric acid (0.93 mol, 2.0 eq) and 28.9 g of boric acid (0.47 mol, 1.0 eq) are stirred in 153 g of butanol and heated to reflux. 140.3 g of oleylamine (0.93 mol, 2.0 eq) is added via an additional funnel. The resulting reaction is heated to 140~145° C. while removing partial solvent and held for 5 h. The solvent is then removed via vacuum distillation to yield the final product without further purification. $^{11}$B NMR (160 MHz, $CDCl_3$) ppm: 9.48 (br). Elemental analysis: 1.3% B, 3.2% N.

Compound Example 10: Tetrahedral Borated N-oleyl Tartrimide by Solvent Process Procedure 2 (In Situ Tartrimide Formation with Post Add of Boric Acid to Form Tetrahedral Complex)

1201 g of tartaric acid (8.0 mol, 2.0 eq) is stirred in 850 g of pentanol and heated to reflux. 2140 g of oleylamine (8.0 mol, 2.0 eq) is added over 1 h. The reaction is held at 140° C. for 5 hours and then cooled to 110° C. 123.6 g of boric acid (2.0 mol, 0.5 eq) is added in one portion. The reaction mixture is then heated to 140° C. and held for 2 h. The solvent is then removed via vacuum distillation to yield the final product without further purification. $^{11}$B NMR (160 MHz, CDCl$_3$) ppm: 10.39 (br), 7.32 (br), 6.21 (br). Elemental analysis: 0.6% B, 3.3% N.

Compound Example 11: Tetrahedral Borate Prepared from Glycerol Mono-Oleate (GMO), Boric Acid and an Amine 254 g of GMO (0.5 mol, 2.0 eq) and 15.5 g of boric acid (0.25 mol, 1.0 eq) are heated to 165° C. while stirring. The reaction is held for 3 h at this temperature. 46.4 g of tri-n-butylamine (0.25 mol, 1.0 eq) is then added in one portion. The resulting reaction mixture is held at 165° C. for an additional 3 hours to yield the desired product without further purification. $^{11}$B NMR (160 MHz, CDCl$_3$) ppm: 11.39 (br).

Compound Example 12: Tetrahedral Borate Prepared from Glycerol Mono-Oleate (GMO), Boric Acid and a 400 TBN Ca Detergent 257 g of GMO (0.5 mol, 2.0 eq) and 15.7 g of boric acid (0.25 mol, 1.0 eq) are heated to 165° C. while stirring. The reaction is held for 4 h at this temperature. 35.5 g of a 400 TBN Ca detergent is added and the reaction is held at 165° C. for an additional 3 h. The crude product is filtered to yield the desired product. $^{11}$B NMR (160 MHz, CDCl$_3$) ppm: 9.98 (br), 6.75 (br).

Compound Example 13: Tetrahedral Borate Prepared from Glycerol Mono-Oleate (GMO), Boric Acid and a 100 TBN Polyisobutylene Succinimide (PIBSA) Dispersant 508 g of GMO (1.0 mol, 2.0 eq), 241.3 g of a trigonal borate ester (0.5 mol, 1.0 eq), and 280.5 g of a 100 TBN polyisobutylene succinimide (PIBSA) dispersant (0.5 mol, 1.0 eq) are mixed at 80° C. for 2 h to yield the desired product without further purification. $^{11}$B NMR (160 MHz, CDCl$_3$) ppm: 22.73 (br), 17.58 (br), 10.08 (br).

Compound Example 14: Tetrahedral Borate Prepared from 1,2-octanediol, Boric Acid and an Amine 146 g of 1,2-octanediol (1.0 mol, 2.0 eq) and 30.9 g of boric acid (0.5 mol, 1.0 eq) are heated to 165° C. while stirring. The reaction is held at this temperature for 2 h and then cooled to 140° C. 64.6 g of 2-ethylhexylamine (0.5 mol, 1.0 eq) is added via an additional funnel. The resulting mixture is stirred at 140° C. for 3 h to afford the desired product without further purification. $^{11}$B NMR (160 MHz) ppm: 11.71 (br)

A series of lubricating compositions comprising tetrahedral borate compounds according to the present invention may be prepared as per the following examples.

Comparative Lubricant Example CLE1: Lubricating Composition in Passenger Car Engine Oil with Mixed Overbased Ca/Na Sulfonate Detergents A 0W-20 GF-5 passenger car engine oil is used as a baseline for comparison. The 0W-20 GF-5 passenger car engine oil also contains other components including overbased calcium sulfonate detergent, overbased sodium sulfonate detergent, zinc dialkyldithiophosphate, ashless antioxidant, ashless succinimide dispersant, foam inhibitors, viscosity index improvers, pour point depressants, and Group III mineral oil.

Comparative Lubricant Example CLE2: Lubricating Composition in Passenger Car Engine Oil with all-Ca Sulfonate Overbased Detergent A 0W-20 GF-5 passenger car engine oil is prepared similar to Comparative Example 1, except that the detergent is comprised of only Ca-sulfonate overbased sulfonate, is used as a second baseline for comparison.

Comparative Lubricant Example CLE3: Lubricating Composition with OT in Passenger Car Engine Oil with Mixed Overbased Ca/Na Sulfonate Detergents A 0W-20 GF-5 passenger car engine oil is prepared similar to Comparative Example 1, except that 1.25% OT is added.

Comparative Lubricant Example CLE4: Lubricating Composition with OT in Passenger Car Engine Oil with all-Ca Sulfonate Overbased Detergent A 0W-20 GF-5 passenger car engine oil is prepared similar to Comparative Example 2, except that 1.25% OT is added.

Lubricant Example LE7: Lubricating Composition with PIBSA Dispersant-Based Ionic Tetrahedral OT-Borate in Passenger Car Engine Oil with all-Ca Sulfonate Overbased Detergent A 0W-20 GF-5 passenger car engine oil is prepared similar to Comparative Example 2, except that 7.90% of the ionic tetrahedral borate compound of Example 1a is added.

Lubricant Example LE8: Lubricating Composition with Calcium Sulfonate Detergent-Based Ionic Tetrahedral OT Borate in Passenger Car Engine Oil with Mixed Overbased Ca/Na Sulfonate Detergents A 0W-20 GF-5 passenger car engine oil is prepared similar to Comparative Example 2, except that 3.20% of the ionic tetrahedral borate compound of Example 2 is added.

Lubricant Example LE9: Lubricating Composition with Calcium Sulfonate Detergent-Based Ionic Tetrahedral OT Borate in Passenger Car Engine Oil with Mixed Overbased Ca/Na Sulfonate Detergents A 0W-20 GF-5 passenger car engine oil is prepared similar to Comparative Example 2, except that 3.20% of the ionic tetrahedral borate compound of Example 3 is added).

Results of tests for clarity and friction reduction for Lubricant Examples 7-9 and Comparative Lubricant Examples 1-3 are shown in Table 2.

Clarity is evaluated by storage of the samples in glass tubes at room temperature and visual rating at room temperature after 1 and 2 weeks, where C=Clear, S1=slight trace sediment, S2=trace sediment, S3=light sediment, Z1=slightly hazy, Z2=hazy.

Friction reduction is evaluated using a high frequency reciprocating rig (HFRR) with a 500 g load at 100 Htz. an is reported as the acerage coefficient of friction from 40-160 C.

The clarity results in Table 2 demonstrate that formation of the tetrahedral borate complex results in significant enhancement in solubility of OT, even at higher concentrations of OT than can be solubilized in the baseline oils.

The HFRR results show that the OT tetrahedral borate complexes provide friction reduction over the baseline oils, demonstrating that formation of the complexes does not degrade the ability of oleyl tartrimide to function as a friction modifier.

TABLE 2

Friction and Clarity measurements of finished lubricants

|  | LE7 | LE8 | LE9 | CLE1 | CLE2 | CLE3 | CLE4 |
|---|---|---|---|---|---|---|---|
| EX1a, wt % | 7.90% | | | | | | |
| EX2, wt % | | 3.20% | | | | | |
| EX3, wt % | | | 3.20% | | | | |
| Oil (1), wt % | | 96.80% | 96.80% | 100% | | 98.50% | |
| Oil (2), wt % | 92.10% | | | | 100% | | 98.50% |
| oleyl tartrimide (OT), wt % | | | | | | 1.25% | 1.25% |
| wt % OT present | 1.73% | 2.25% | 2.25% | 0% | 0% | 1.25% | 1.25% |
| Clarity, 1 wk | C | C | | C | C | C | Z1/S2 |
| Clarity, 2 wk | C | C/S1 | | C | C | C/S2 | C/S3 |
| Ave Friction, 40-160° C. | 0.075 | 0.069 | 0.074 | 0.093 | 0.088 | NM | NM |

NM = not measured
(1) 0W-20 GF-5 Oil w/Na/Ca detergent mix
(2) 0W-20 GF-5 Oil w/All-Ca detergent Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A fully-formulating lubricating composition comprising:
   an oil of lubricating viscosity;
   an ionic tetrahedral borate compound including:
      a tetrahedral borate anion having a boron atom with two bidentate di-oxo ligands both being a linear $C_{18}$-tartrimide;
   a first dispersant comprising a conventional ammonium substituted polyisobutenyl succinimide compound having a polyisobutenyl number average molecular weight of 750 to 2,500;
   a second dispersant comprising an ammonium substituted polyisobutenyl succinimde compound having an N:CO ratio of 1.8 and a polyisobutylenyl number average molecular weight of 750 to 2,500,
   wherein one or more of the first dispersant and the second dispersant are in cationic form; and
   a performance additive selected from the group consisting of a detergent, an antioxidant, a dispersant, an anti-wear agent, a viscosity modifier, an extreme pressure agent, a foam inhibitor, a corrosion inhibitor, a pour point depressant, a friction modifier, a demulsifier, and a seal swell agent.

2. The composition according to claim 1, wherein the ionic tetrahedral borate compound is represented by the following formula:

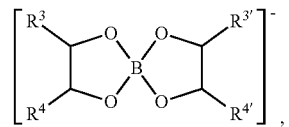

wherein,
R3 and R4 form a 5 membered nitrogen containing ring substituted with a linear $C_{18}$ group.

3. The composition according to claim 1, wherein the oil of lubricating viscosity includes a base oil selected from the group consisting of a Group I base oil, a Group II base oil, a Group II base oil, a Group III base oil, a Group IV base oil, and a Group V base oil.

4. The composition of according to claim 1, wherein the detergent includes an overbased metal-containing detergent selected from the group consisting of an alkaline earth metal sulfonate, a phenate, and a salicylate.

5. The composition according to claim 1, wherein the detergent is present in the composition in an amount ranging from 0.01 wt. % to 1.1 wt. %.

6. The composition according to claim 1, wherein the dispersant includes a polyisobutenylsuccinimide.

7. The composition according to claim 1, wherein the dispersant is present in the composition an amount ranging from 0.01 wt. % to 20 wt. %.

8. The composition according to claim 1, wherein the antioxidant includes an ashless antioxidant.

9. The composition according to claim 1, wherein the antioxidant is present in the composition in an amount ranging from 0.1 wt. % to 3 wt. %.

10. The composition according to claim 1, wherein the anti-wear agent includes a zinc dialkyldithiophosphate.

11. The composition according to claim 1, wherein the anti-wear agent is present in the composition in an amount ranging from 0.01 wt. % to 3 wt. %.

12. The composition according to claim 1, wherein the viscosity modifier is present in the composition in an amount ranging from 0.01 wt. % to 10 wt. %.

13. The composition according to claim 1, wherein the extreme pressure agent is present in the composition in an amount ranging from 0.01 wt. % to 3 wt. %.

14. The composition according to claim 1, wherein the foam inhibitor is selected from the group consisting of polysiloxanes, copolymers of ethyl acrylateand and 2-ethylhexylacrylate, fluorinated polysiloxanes, trialkyl phosphates, polyethylene glycols, polyethylene oxides, polypropylene oxides and (ethylene oxide-propylene oxide) polymers.

15. The composition according to claim 1, wherein the corrosion inhibitor is selected from the group consisting of fatty amines, octylamine octanoate, condensation products of dodecenyl succinic acid or anhydride, a fatty acids, derivatives of benzotriazoles, 1,2,4-triazoles, benzimidazoles, 2-alkyldithiobenzimidazoles and 2-alkyldithiobenzothiazoles.

16. The composition according to claim 1, wherein the pour point depressant is selected from the group consisting of polyalphaolefins, esters of maleic anhydride-styrene copolymers, polymethacrylates, polyacrylates, and polyacrylamides.

17. The composition according to claim 1, wherein the friction modifier includes a nitrogen-containing molybdenum compound present in the composition in an amount ranging from 0.005 to 2 wt. %.

18. The composition according to claim 1, wherein the demulsifier is selected from the group consisting trialkyl phosphates, and polymers and copolymers of ethylene glycol, ethylene oxide, propylene oxide.

19. The composition according to claim 1, wherein the seal swell agent includes a sulfolene derivate.

20. The composition according to claim 1, further comprising an oil soluble titanium compound.

21. A fully-formulated lubricating composition comprising:
an oil of lubricating viscosity;
an ionic tetrahedral borate compound including:
a tetrahedral borate anion having a boron atom with two bidentate di-oxo ligands both being a linear $C_{18}$-tartrimide,
a first dispersant comprising a conventional ammonium substituted polyisobutenyl succinimide compound having a polyisobutenyl number average molecular weight of 750 to 2,500, and
a second dispersant comprising an ammonium substituted polyisobutenyl succinimde compound having an N:CO ratio of 1.8 and a polyisobutylenyl number average molecular weight of 750 to 2,500;
wherein one or more of the first dispersant and the second dispersant are in cationic form;
a third polyisobutenylsuccinimide dispersant;
an overbased metal-containing detergent selected from the group consisting of an alkaline earth metal sulfonate, a phenate and a salicylate;
a zinc dialkyldithiophosphate;
an ashless antioxidant; and
a performance additive selected from the group consisting of a viscosity modifier, an extreme pressure agent, a foam inhibitor, a corrosion inhibitor, a pour point depressant, a friction modifier, a demulsifier, and a seal swell agent.

22. A method of lubricating an internal combustion engine, comprising:
supplying a fully-formulated lubricating composition to a lubricating system of the engine, the fully-formulated lubricating composition including:
an oil of lubricating viscosity;
an ionic tetrahedral borate compound including:
a tetrahedral borate anion having a boron atom with two bidentate di-oxo ligands both being a linear $C_{18}$-tartrimide;
a first dispersant comprising a conventional ammonium substituted polyisobutenyl succinimide compound having a polyisobutenyl number average molecular weight of 750 to 2,500;
a second dispersant comprising an ammonium substituted polyisobutenyl succinimde compound having an N:CO ratio of 1.8 and a polyisobutylenyl number average molecular weight of 750 to 2,500,
wherein one or more of the first dispersant and the second dispersant are in cationic form; and
a performance additive selected from the group consisting of a detergent, an antioxidant, a dispersant, an anti-wear agent, a viscosity modifier, an extreme pressure agent, a foam inhibitor, a corrosion inhibitor, a pour point depressant, a friction modifier, a demulsifier, and a seal swell agent.

23. The method according to claim 22, wherein the ionic tetrahedral borate compound is represented by the following formula:

$$\left[ \begin{array}{c} R^3 \\ \phantom{x} \\ R^4 \end{array} \begin{array}{c} O \\ \phantom{x} \\ O \end{array} B \begin{array}{c} O \\ \phantom{x} \\ O \end{array} \begin{array}{c} R^{3'} \\ \phantom{x} \\ R^{4'} \end{array} \right]^-,$$

wherein,
R3 and R4 form a 5-membered nitrogen containing ring substituted with an linear $C_{18}$ group.

24. The method according to claim 22, wherein the oil of lubricating viscosity includes a base oil selected from the group consisting of a Group I base oil, a Group II base oil, a Group II base oil, a Group III base oil, a Group IV base oil, and a Group V base oil.

25. The method of according to claim 22, wherein the detergent includes an overbased metal-containing detergent selected from the group consisting of an alkaline earth metal sulfonate, a phenate, and a salicylate.

26. The method according to claim 22, wherein the detergent is present in the composition in an amount ranging from 0.01 wt. % to 1.1 wt. %.

27. The method according to claim 22, wherein the dispersant includes a polyisobutenylsuccinimide.

28. The method according to claim 22, wherein the dispersant is present in the composition an amount ranging from 0.01 wt. % to 20 wt. %.

29. The method according to claim 22, wherein the antioxidant includes an ashless antioxidant.

30. The method according to claim 22, wherein the antioxidant is present in the composition in an amount ranging from 0.1 wt. % to 3 wt. %.

31. The method according to claim 22, wherein the anti-wear agent includes a zinc dialkyldithiophosphate.

32. The method according to claim 22, wherein the anti-wear agent is present in the composition in an amount ranging from 0.01 wt. % to 3 wt. %.

33. The method according to claim 22, wherein the viscosity modifier is present in the composition in an amount ranging from 0.01 wt. % to 10 wt. %.

34. The method according to claim 22, wherein the extreme pressure agent is present in the composition in an amount ranging from 0.01 wt. % to 3 wt. %.

35. The method according to claim 22, wherein the foam inhibitor is selected from the group consisting of polysiloxanes, copolymers of ethyl acrylateand and 2-ethylhexylacrylate, fluorinated polysiloxanes, trialkyl phosphates, polyethylene glycols, polyethylene oxides, polypropylene oxides and (ethylene oxide-propylene oxide) polymers.

36. The method according to claim 22, wherein the corrosion inhibitor is selected from the group consisting of fatty amines, octylamine octanoate, condensation products of dodecenyl succinic acid or anhydride, a fatty acids, derivatives of benzotriazoles, 1,2,4-triazoles, benzimidazoles, 2-alkyldithiobenzimidazoles and 2-alkyldithiobenzothiazoles.

37. The method according to claim 22, wherein the pour point depressant is selected from the group consisting of polyalphaolefins, esters of maleic anhydride-styrene copolymers, polymethacrylates, polyacrylates, and polyacrylamides.

38. The method according to claim 22, wherein the friction modifier includes a nitrogen-containing molybdenum compound present in the composition in an amount ranging from 0.005 to 2 wt. %.

39. The method according to claim 22, wherein the demulsifier is selected from the group consisting trialkyl phosphates, and polymers and copolymers of ethylene glycol, ethylene oxide, propylene oxide.

40. The method according to claim 22, wherein the seal swell agent includes a sulfolene derivate.

41. The method according to claim 22, further comprising an oil soluble titanium compound.

* * * * *